United States Patent
Li

(10) Patent No.: US 11,921,746 B2
(45) Date of Patent: Mar. 5, 2024

(54) DATA REPLICATION METHOD AND APPARATUS, COMPUTER DEVICE, AND STORAGE MEDIUM

(71) Applicant: Tencent Technology (Shenzhen) Company Limited, Shenzhen (CN)

(72) Inventor: Haixiang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 290 days.

(21) Appl. No.: 17/330,276

(22) Filed: May 25, 2021

(65) Prior Publication Data

US 2021/0279254 A1    Sep. 9, 2021

Related U.S. Application Data

(63) Continuation of application No. PCT/CN2020/084085, filed on Apr. 10, 2020.

(30) Foreign Application Priority Data

May 5, 2019    (CN) .......................... 201910368297.X

(51) Int. Cl.
G06F 16/00 (2019.01)
G06F 16/22 (2019.01)
(Continued)

(52) U.S. Cl.
CPC ........ *G06F 16/273* (2019.01); *G06F 16/2282* (2019.01); *G06F 16/258* (2019.01)

(58) Field of Classification Search
CPC ... G06F 16/273; G06F 16/2282; G06F 16/258
(Continued)

(56) References Cited

U.S. PATENT DOCUMENTS

2005/0114285 A1*    5/2005    Cincotta ............. G06F 11/2097
2010/0332448 A1    12/2010    Holenstein et al.
(Continued)

FOREIGN PATENT DOCUMENTS

CN    101719165 A    6/2010
CN    104239476 A    12/2014
(Continued)

OTHER PUBLICATIONS

Tencent Technology, JP Office Action, Japanese Patent Application No. 2021-532087, dated Aug. 22, 2022, 9 pgs.
(Continued)

*Primary Examiner* — Chelcie L Daye
(74) *Attorney, Agent, or Firm* — Morgan, Lewis & Bockius LLP

(57) ABSTRACT

This application discloses a data replication method and apparatus, a computer device, and a storage medium, and belongs to the field of database technologies. The method includes: adding, when a commitment operation of a transaction is detected, historical state data of the transaction to a data queue; adding at least one piece of historical state data in the data queue to a transmission buffer; and replicating, when a first preset condition is met, the at least one piece of historical state data in the transmission buffer to a cluster device. In this application, a node device does not need to convert an original historical state data format into a log format, and the cluster device does not need to parse a log into an original data format for storage, thereby avoiding a cumbersome log replay procedure, and improving the efficiency of the data replication process.

20 Claims, 8 Drawing Sheets

(51) Int. Cl.
   *G06F 16/25* (2019.01)
   *G06F 16/27* (2019.01)
(58) Field of Classification Search
   USPC .......................................................... 707/615
   See application file for complete search history.

(56) References Cited

U.S. PATENT DOCUMENTS

| | | | |
|---|---|---|---|
| 2016/0147617 | A1 | 5/2016 | Lee et al. |
| 2018/0096018 | A1 | 4/2018 | Cazin |
| 2018/0260149 | A1* | 9/2018 | Zhou ........................ G06F 3/067 |

FOREIGN PATENT DOCUMENTS

| | | | |
|---|---|---|---|
| CN | 102609479 | B | 11/2015 |
| CN | 109902127 | A | 6/2019 |
| CN | 109992628 | A | 7/2019 |
| CN | 110209734 | A | 9/2019 |
| EP | 0772136 | A2 | 5/1997 |
| JP | H 03122729 | A | 5/1991 |
| JP | 2006092005 | A | 4/2006 |
| JP | 2006260292 | A | 9/2006 |
| JP | 2010527087 | A | 8/2010 |
| JP | 2015064850 | A | 4/2015 |
| WO | WO 2007028249 | A1 | 3/2007 |

OTHER PUBLICATIONS

Extended European Search Report, EP20802129.5, dated Apr. 28, 2022, 9 pgs.
Tencent Technology, WO, PCT/CN2020/084085, Jul. 10, 2020, 5 pgs.
Tencent Technology, IPRP, PCT/CN2020/084085, Nov. 2, 2021, 6 pgs.
Tencent Technology, ISR, PCT/CN2020/084085, Jul. 10, 2020, 3 pgs.
Shengjie Wang et al., "Continuous Data Protection Method for Ceph Distributed Block Storage", Network Security Technology & Application, Feb. 15, 2017, 5 pgs., Retrieved from the Internet: http://www.cnki.com.cn/Article/CJFDTotal-WLAQ201702052.htm.

* cited by examiner

| Server number | Server status | Responsible department | Region |
|---|---|---|---|
| ... | ... | ... | ... |

| Server number | Server status (before) | Server status (after) | Operation time |
|---|---|---|---|
| Server number #1 | Provide services | Service interruption | 2019-4-16 00:00:00 |
| Server number | Responsible department (before) | Responsible department (after) | Operation time |
| Server number #1 | Department A | Department B | 2019-4-16 00:00:00 |

DATA REPLICATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2020/084085, entitled "DATA REPLICATION METHOD AND APPARATUS, COMPUTER DEVICE, AND STORAGE MEDIUM" filed on Apr. 10, 2020, which claims priority to Chinese Patent Application No. 201910368297X, entitled "DATA REPLICATION METHOD AND APPARATUS, COMPUTER DEVICE, AND STORAGE MEDIUM" and filed with the National Intellectual Property Administration, PRC on May 5, 2019, all of which are incorporated herein by reference in their entirety.

FIELD OF THE TECHNOLOGY

This application relates to the field of database technologies, and in particular, to a data replication technology.

BACKGROUND OF THE DISCLOSURE

In database technologies, especially online analytical processing (OLAP) systems, data warehouses, big data analysis and other scenarios, data usually needs to be replicated from a database, to back up existing data in a timely manner.

During replication, two types of devices, that is, a primary device and a secondary device, are usually involved. For a current database (for example, Oracle, MySQL, or InnoDB), the primary device may periodically replicate data files in the database to the secondary device, to implement synchronization between data files in the primary device and the secondary device. Further, to avoid that data in the primary device and the secondary device is inconsistent due to damage to the data files during replication, after a communication connection is established between the primary device and the secondary device, a redo log is synchronized between databases of the primary device and the secondary device. If an abnormality occurs in the replication process, the secondary device may delete abnormal data by replaying the redo log.

However, parsing and replaying of the redo log are relatively complex. In a scenario with a large data volume, a relatively long time is required for the secondary device to replay the redo log, affecting the efficiency of the data replication process.

SUMMARY

Embodiments of this application provide a data replication method and apparatus, a computer device, and a storage medium, which can resolve a problem that a long time is required to replicate data based on a redo log, and parsing and replaying of the redo log are complex, affecting the efficiency of data replication. The technical solutions are as follows:

In one aspect, a data replication method is performed by a computer device (a node device), the method including:
  adding, when a commitment operation of a transaction is detected, historical state data of the transaction to a data queue, the data queue being configured for caching historical state data;
  adding at least one piece of historical state data in the data queue to a transmission buffer, the transmission buffer being configured for caching to-be-replicated historical state data; and
  replicating, when a first preset condition is met, the at least one piece of historical state data in the transmission buffer to a cluster device.

In one aspect, a data replication method is performed by a computer device (a cluster device), the method including:
  receiving, from a receiving buffer, at least one piece of historical state data transmitted by a node device, the receiving buffer being configured for caching received historical state data;
  adding the at least one piece of historical state data in the receiving buffer to a forwarding buffer, and converting, by using the forwarding buffer, the at least one piece of historical state data into data meeting a tuple format, to obtain at least one data item, the forwarding buffer being configured for performing data format conversion on historical state data; and
  storing the at least one data item in at least one target data table of a cluster database, one target data table being corresponding to one original data table in which one data item is located in the node device.

In one aspect, a data replication apparatus is provided, including:
  an addition module, configured to add, when a commitment operation of a transaction is detected, historical state data of the transaction to a data queue, the data queue being configured for caching historical state data,
  the addition module being further configured to add at least one piece of historical state data in the data queue to a transmission buffer, the transmission buffer being configured for caching to-be-replicated historical state data; and a replication module, configured to replicate, when a first preset condition is met, the at least one piece of historical state data in the transmission buffer to a cluster device.

In one aspect, a data replication apparatus is provided, including:
  a receiving module, configured to receive, from a receiving buffer, at least one piece of historical state data transmitted by a node device, the receiving buffer being configured for caching received historical state data;
  an addition module, configured to add the at least one piece of historical state data in the receiving buffer to a forwarding buffer, and convert, by using the forwarding buffer, the at least one piece of historical state data into data meeting a tuple format, to obtain at least one data item, the forwarding buffer being configured for performing data format conversion on historical state data; and
  a storage module, configured to store the at least one data item in at least one target data table of a cluster database, one target data table being corresponding to one original data table in which one data item is located in the node device.

In one aspect, a computer device is provided, including a processor and a memory, the memory storing at least one instruction, the at least one instruction being loaded and executed by the processor to implement the data replication method in any one of the foregoing possible implementations.

In one aspect, a non-transitory computer-readable storage medium is provided, storing at least one instruction, the at least one instruction being loaded and executed by a processor to implement the data replication method in any one of the foregoing possible implementations.

In one aspect, a computer program product is provided, including instructions, the instructions, when run on a computer, causing the computer to perform the data replication method in any one of the foregoing possible implementations.

The technical solutions provided in the embodiments of this application achieve at least the following beneficial effects:

In a case that a commitment operation of a transaction is detected, historical state data of the transaction is added to a data queue, to cache the historical state data of the transaction into the data queue. At least one piece of historical state data in the data queue is added to a transmission buffer, so that a transmission process or a transmission thread is performed based on the transmission buffer. In a case that a first preset condition is met, the at least one piece of historical state data in the transmission buffer is replicated to a cluster device, so that a node device can replicate at least one piece of historical state data in the transmission buffer to the cluster device every time the first preset condition is met. In this way, the node device does not need to convert an original historical state data format into a log format, and the cluster device does not need to parse a log into an original data format for storage. Therefore, the redo log does not need to be replayed for historical state data during data replication, avoiding a cumbersome replay procedure, shortening a duration of a replay process of the redo log, and improving the efficiency of the data replication process.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
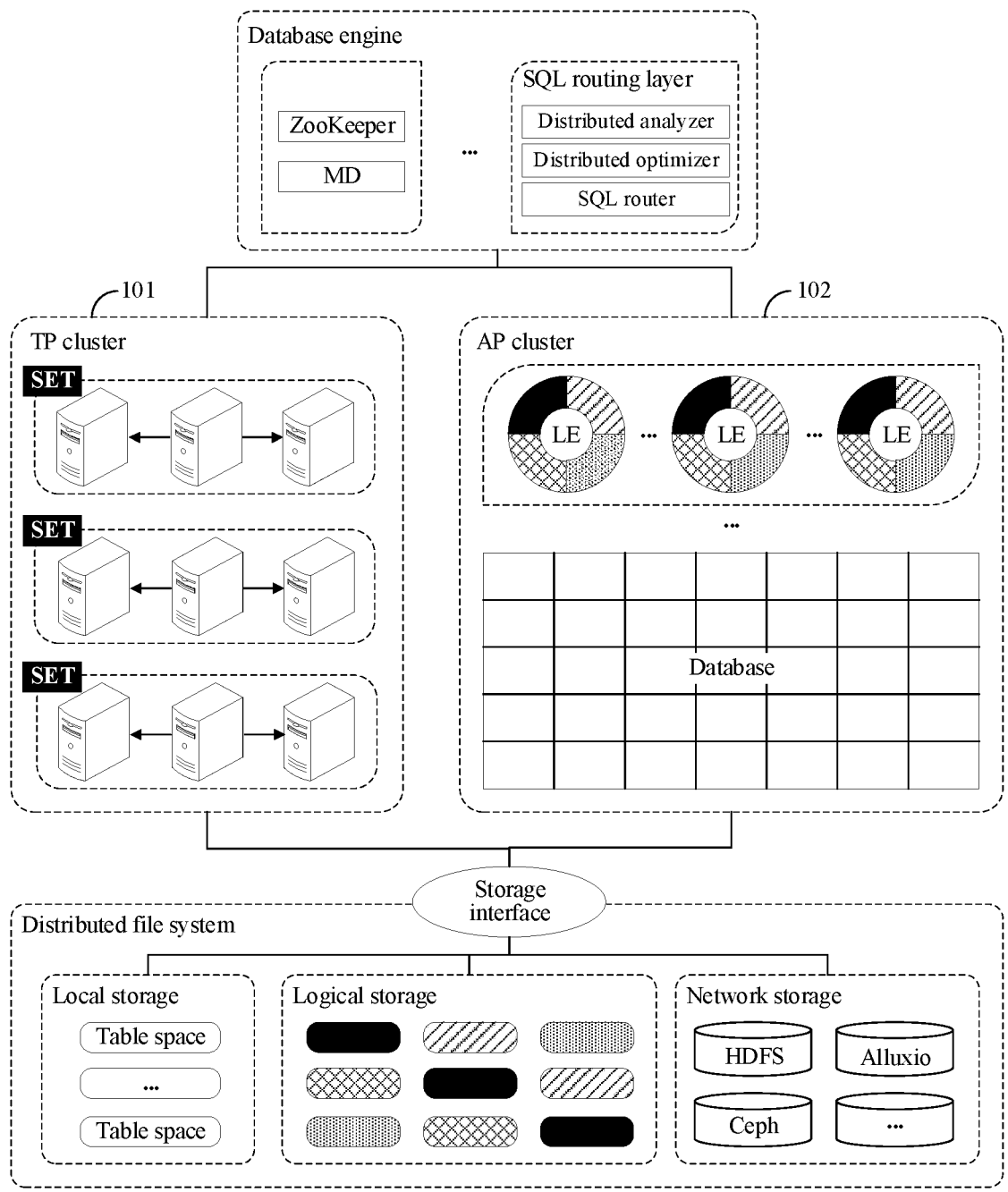
FIG. 1 is a schematic diagram of an implementation environment of a data replication method according to an embodiment of this application.

To make the objectives, technical solutions, and advantages of this application clearer, the following further describes implementations of this application in detail with reference to the accompanying drawings.

Before the embodiments of this application are described, some basic concepts in database technologies are first described as follows:

A database involved in the embodiments of this application stores a plurality of data tables. Each data table may be used for storing tuples. The database may be any type of database based on multi-version concurrency control (MVCC). In the embodiments of this application, a type of the database is not specifically limited.

Based on state attributes, data in the foregoing database may include three states: current state, transitional state, and historical state. The three states are collectively referred to as "a full state of data" briefly referred to as full state data. Different state attributes in the full state data may be used for identifying states of data in a life cycle track thereof.

Current state: Data of the latest version of a tuple is data at a current stage. A state of the data at the current stage is referred to as a current state.

Transitional state: It is neither the latest version nor a historical state version of a tuple, and data that is in a transitional state and in a process of changing from a current state to a historical state is referred to as half-decay data.

Historical state: It is a state of a tuple in history, of which a value is an old value, but not a current value. A state of data at a historical stage is referred to as a historical state. There may be a plurality of historical states of one tuple, which reflect a state change process of the data. The data in the historical state can be read only, but cannot be modified or deleted.

Under an MVCC mechanism, all the three states of the data exist. Under a non-MVCC mechanism, there may only be the historical state data and the current state data. Under the MVCC mechanism or a locking-based concurrency control mechanism, a new value of the data obtained after a transaction is committed is in the current state. Under the MVCC mechanism, a state of data generated by a transaction before a minimum transaction in a currently active transaction list is in the historical state. Under the locking-based concurrency control mechanism, after a transaction is committed, a value of data before the commitment becomes a value in the historical state, that is, an old value of the tuple is in the historical state. There is still an active transaction (which is not the latest related transaction) in use in a read version. Because the latest related transaction modifies a value of the tuple, and the latest value of the tuple is already in a current state, a value that is read is already in a historical state relative to the current state. Therefore, a data state of the tuple is between the current state and the historical state, and is thus referred to as the transitional state.

For example, under the MVCC mechanism, a balance of an account A in a user table changes from RMB 10 yuan to RMB 20 yuan after top-up, and then changes to RMB 5 yuan by consuming RMB 15 yuan. If a financial institution B starts to read the data and check the transaction from this time, and afterward, the balance of the account A changes to RMB 25 yuan by topping up RMB 20 yuan, RMB 25 yuan is current state data, RMB 5 yuan that B is reading is transitional state data, and the remaining two values 20 and 10 are states that have existed in history, and are both historical state data.

Based on the foregoing term explanations, FIG. 1 is a schematic diagram of an implementation environment of a data replication method according to an embodiment of this application. Referring to FIG. 1, the implementation environment may be collectively referred to as a hybrid transaction/analytical cluster (HTAC) architecture. The HTAC architecture may include a transaction processing (TP) cluster 101 and an analytical processing (AP) cluster 102.

The TP cluster 101 is configured to provide a transaction processing service. The TP cluster may include a plurality of node devices 103. In a data replication process, the plurality of node devices are configured to provide to-be-replicated historical state data, and each node device of the TP cluster 101 may be provided with a node database. Each node device may be a stand-alone device, or may be a cluster device with one primary device and two secondary devices. A type of the node device is not specifically limited in the embodiments of this application.

The AP cluster 102 is configured to provide a query and analysis service of historical state data. The AP cluster may include a cluster device, and the cluster device may be provided with a cluster database. In a data replication process, the cluster device is configured to replicate historical state data transmitted by the plurality of node devices and store the historical state data in the cluster database, to provide a query and analysis service based on the historical state data stored in the cluster database. The cluster database may be a local database, or may be a distributed file system accessed by the cluster device through a storage interface, so that an unlimited storage function may be provided for the TP cluster by using the distributed file system. For example, the distributed file system may be a Hadoop distributed file system (HDFS), Ceph (which is a distributed file system under a Linux system), and Alluxio (which is a memory-based distributed file system).

Certainly, the cluster device may be formed by combining one or more stand-alone devices or by combining one primary device and two secondary devices. The devices are connected to implement communication. A type of the cluster device is not specifically limited in the embodiments of this application.

In some embodiments, the plurality of node devices in the TP cluster 101 may provide the transaction processing service. Therefore, at a moment at which any transaction has been committed, when new current state data is generated, historical state data corresponding to the current state data is also simultaneously generated. Because the historical state data occupies relatively large storage space, but the historical state data is worthy to be stored, the plurality of node devices may replicate the historical state data to the cluster device based on a data replication method provided in the embodiments of this application. The cluster device stores the historical state data in a data table based on a local executor (LE). After replication is completed, the replicated historical state data may be deleted (or may not be deleted certainly) from the node devices. The historical state data is dumped from the TP cluster to the AP cluster, to ensure that the HTAC architecture not only may store the current state data and transitional state data, but also can properly store the historical state data, thereby implementing a complete storage mechanism of full state data.

In the foregoing process, after the plurality of node devices succeed in replicating the historical state data to the cluster device, metadata of the historical state data in current replication may be further registered with a metadata (MD) manager of the cluster device, to make it convenient for the cluster device to collect, based on the metadata manager, statistics on meta information of historical state data that has been stored.

In some embodiments, a user may perform routing query to find, based on a query statement, semantics of a query operation, and metadata that are provided in a structured query language router (SQL router (SR)) layer, any data stored in the TP cluster 101 or the AP cluster 102. Certainly, the TP cluster 101 mainly provides a query service for current state data, and the AP cluster 102 mainly provides a query service for historical state data. The semantics of the query operation is an operation intention obtained through analysis according to the query statement. For example, a condition of a WHERE clause may indicate an intention of the WHERE clause.

In some embodiments, especially in a big data scenario, a transaction not only involves data modification performed on a node database of a single node device, but also usually involves data modification performed on a node database of at least one other node device. In this case, a cross-node write transaction may be performed based on a distributed consistency algorithm (for example, two-phase commit (2PC)), to ensure the atomicity and the consistency of the transaction performing operations on data.

In the foregoing architecture, one or more node databases corresponding to each node device in the TP cluster 101 may form a database instance set, which may be referred to as a SET. Certainly, if the node device is a stand-alone device, database instances of the stand-alone device form one SET. If the node device is a cluster device with one primary device and two secondary devices, a SET of the node device may be a set of database instances of the primary device and database instances of the two secondary devices. In this case, consistency between data in the primary device and replicated data in the secondary devices may be ensured based on a strong synchronization technology of a cloud database. In some embodiments, linear capacity expansion may be performed on each SET, to meet service processing requirements in the big data scenario.

In some embodiments, the TP cluster 101 may further manage the plurality of node devices 103 by using a distributed coordination system (for example, ZooKeeper). For example, ZooKeeper may make a node device be out of service (that is, delete the node device from the TP cluster 101).

Figure 2:
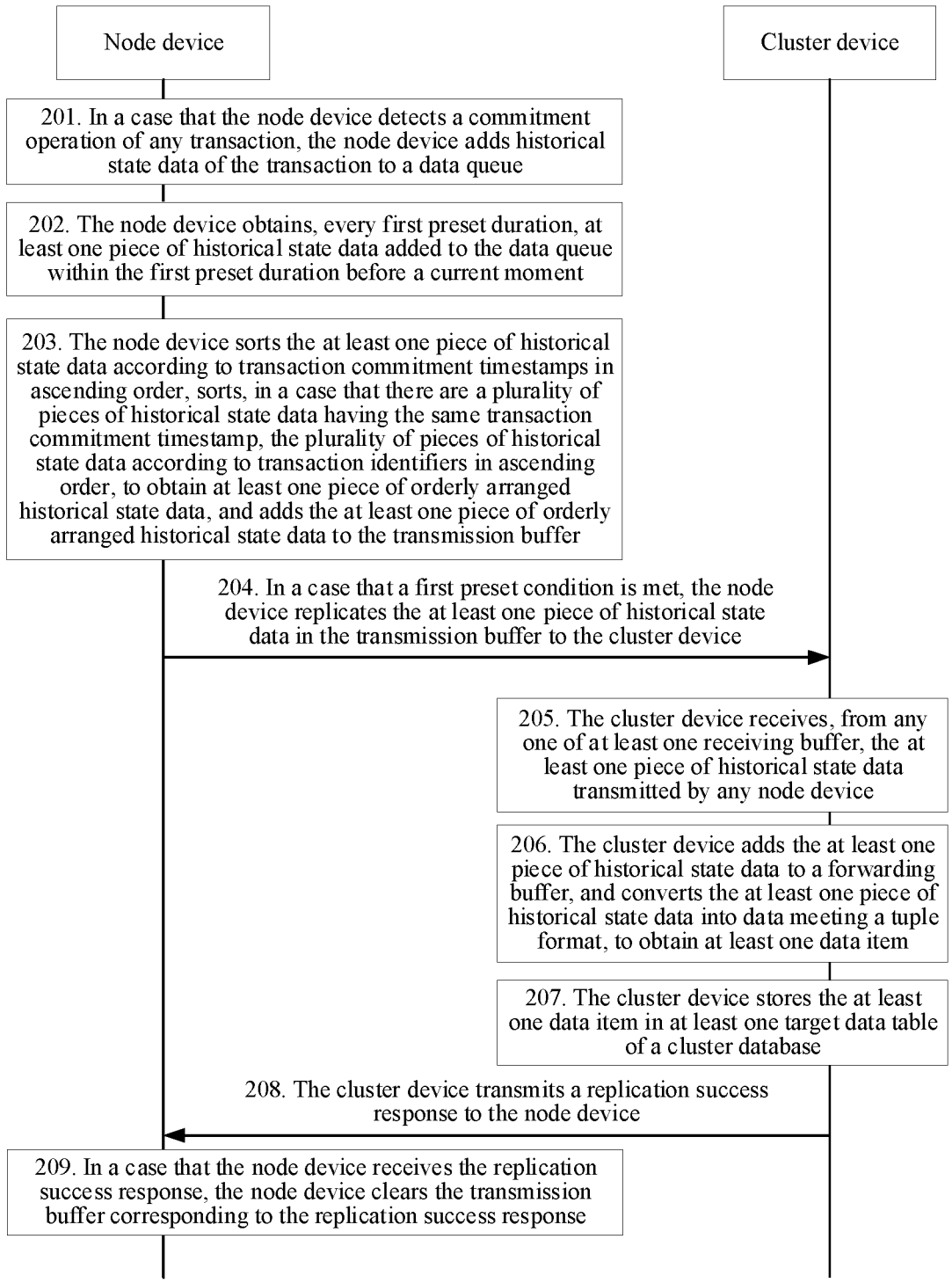
FIG. 2 is an interaction flowchart of a data replication method according to an embodiment of this application.

Based on the foregoing implementation environment, FIG. 2 is an interaction flowchart of a data replication method according to an embodiment of this application. Referring to FIG. 2, description is made by using an example in which any node device in the plurality of node devices in the TP cluster and the cluster device in the AP cluster are used as interaction execution bodies. This embodiment is applied to a process of interaction between the node device and the cluster device. This embodiment includes:

201. In a case that a node device detects a commitment operation of a transaction, the node device adds historical state data of the transaction to a data queue, the data queue being configured for caching historical state data.

In the foregoing process, the node device may be any node device in the TP cluster. The node device may be provided with a node database. With commitment of any transaction, historical state data and new current state data are correspondingly generated in the node database.

On the one hand, description is made by using an updating transaction (an UPDATE operation) as an example. When an updating transaction is performed on a tuple, there may be two steps: one step is to add an updating identifier to the tuple before updating, and the other step is to generate a new tuple for storing modified data content. After commitment of the updating transaction is completed, the tuple before the updating and the new tuple present "readable" states to the outside. That is, only after commitment of the updating transaction is completed, the tuple completes an effective updating process, and a database engine supports a read operation performed on the tuple before the updating and the new tuple. Therefore, a user can find that the tuple is modified.

On the other hand, a deletion transaction (a DELETE operation) also has a similar process. When a deletion transaction is performed on a tuple, a deletion identifier is added to the original tuple. Only after commitment of the deletion transaction is completed, the tuple completes an effective deletion process, and the original tuple presents a "readable" state to the outside. That is, only after commitment of the deletion transaction is completed, a user can find that the tuple is deleted.

Based on the foregoing situation, when the node device provides a transaction processing service and detects a commitment operation of any transaction, the node database obtains historical state data of the transaction. If the node database is a database that does not support storage of historical state data, the node device may simultaneously obtain the historical state data at a moment at which commitment of the transaction is completed, and perform the operation of adding the historical state data to the data queue in step 201, thereby synchronously implementing the commitment operation of the transaction and an addition operation of the data queue.

In some embodiments, some types of node databases (for example, Oracle, MySQL, and InnoDB) support temporary storage of transitional state data or historical state data in a rollback segment manner. In this case, the commitment operation of the transaction and the addition operation of the data queue are asynchronous. The node database can only temporarily store the historical state data, and therefore the database engine periodically purges data stored in a rollback segment. In this case, the node device may obtain, when the database engine performs a purge operation of the rollback segment, the historical state data stored in the rollback segment, and perform the operation of adding the historical state data to the data queue in step 201, thereby asynchronously implementing the commitment operation of the transaction and the addition operation of the data queue.

Figure 3:
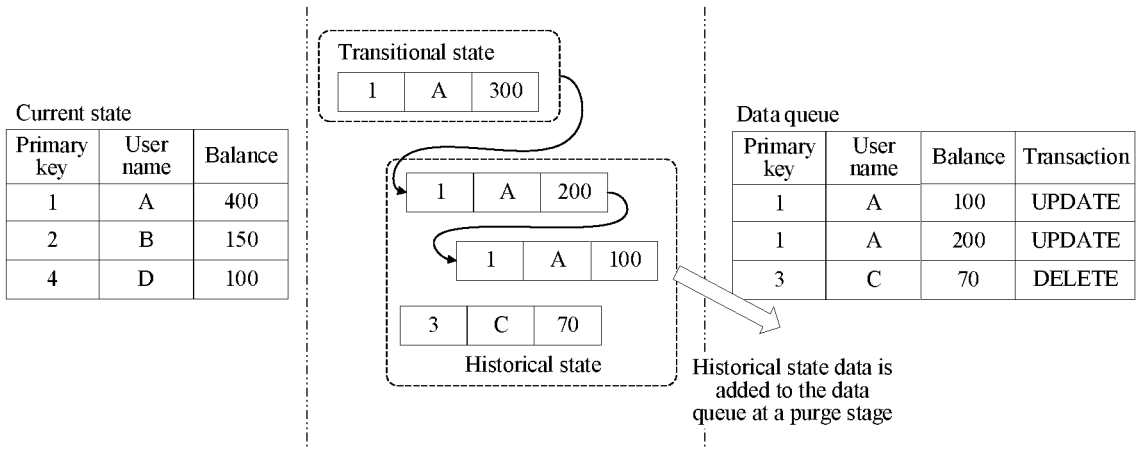
FIG. 3 is a schematic principle diagram of obtaining historical state data according to an embodiment of this application.

For example, FIG. 3 is a schematic principle diagram of obtaining historical state data according to an embodiment of this application. Referring to FIG. 3, assuming that an initial balance of a user A is RMB 100 yuan, the balance changes to RMB 200 yuan by topping up RMB 100 yuan at a first moment, and the balance changes to RMB 300 yuan by topping up RMB 100 yuan again at a moment after a second moment. In this case, a financial institution performs a read operation on the node database. At a third moment at which the read operation is performed, the user A tops up RMB 100 yuan again, so that the balance changes to RMB 400 yuan. In this case, current state data corresponding to the user A is 400, transitional state data is 300, and historical state data includes 100 and 200. An example in which the node database is MySQL is used. A PURGE operation may be performed to purge the rollback segment. When the node device detects the PURGE operation, the node device adds the historical state data (100 and 200 corresponding to the user A) on which the PURGE operation is performed to the data queue. A description is made by using only the historical state data of the user A as an example, and the foregoing method may also be used for a user B, a user C, and a user D. Details are not described herein again.

In some embodiments, some types of node databases (for example, PostgreSQL) support recording of current state data, transitional state data, and historical state data in a data page, and periodic purge of the historical state data in the data page. In this case, the node device may obtain, when the database engine performs a purge operation of the data page, the historical state data stored in the data page, and perform the operation of adding the historical state data to the data queue in step 201, thereby asynchronously implementing the commitment operation of the transaction and the addition operation of the data queue.

Figure 4:
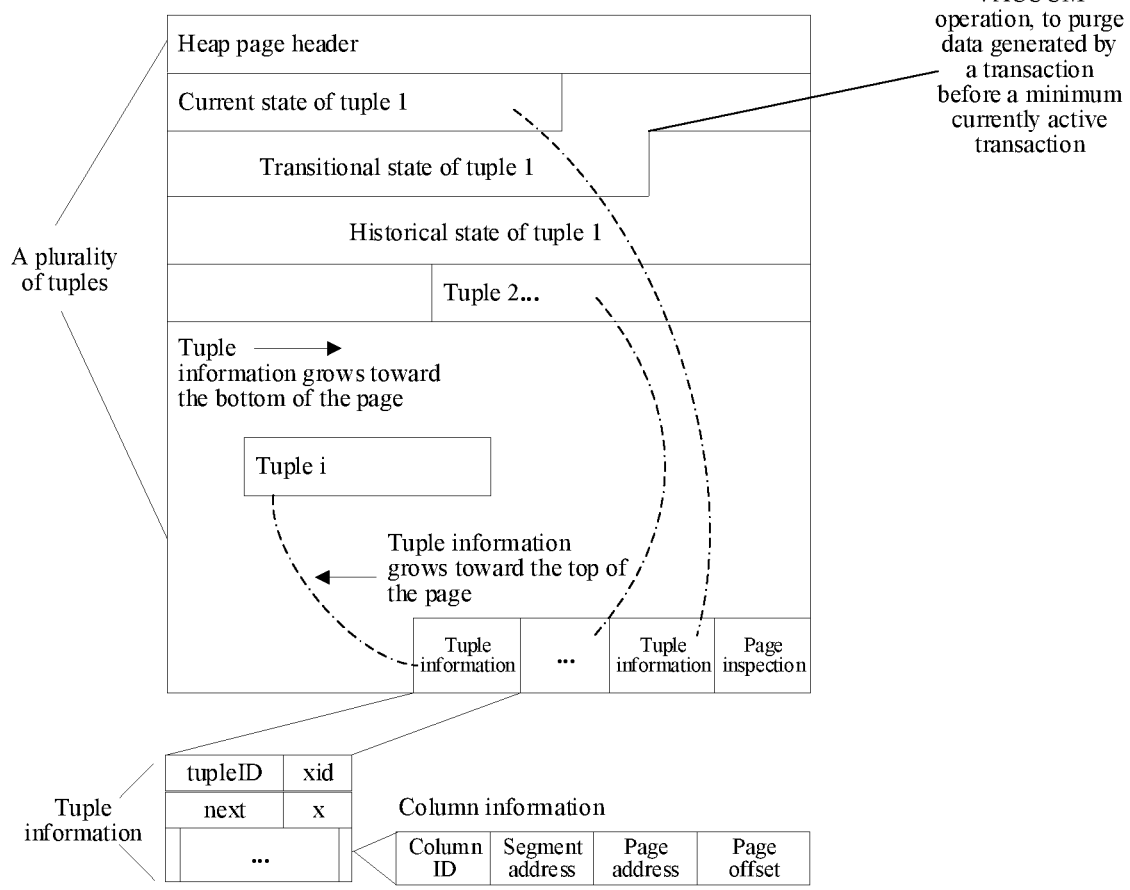
FIG. 4 is a schematic principle diagram of obtaining historical state data according to an embodiment of this application.

For example, FIG. 4 is a schematic principle diagram of obtaining historical state data according to an embodiment of this application. Referring to FIG. 4, an example in which the node database is PostgreSQL is used. The node database records current state data, transitional state data, and historical state data of a plurality of tuples in a data page, and the data page may further record tuple information of the plurality of tuples. The node database purges the data page by performing a VACUUM operation. When the node device detects the VACUUM operation, the historical state data on which the VACUUM operation is performed is added to the data queue, and then data generated by a transaction before a minimum currently active transaction in the data page is purged.

In the process of adding the historical state data to the data queue in any one of the foregoing situations, the node device may include a data buffer. The data buffer caches the historical state data in the form of data queue, and adds the historical state data from an original data table of the node database to a data queue of the data buffer.

202. The node device obtains, every first preset duration, at least one piece of historical state data added to the data queue within the first preset duration before a current moment.

The first preset duration may be any value greater than or equal to 0. For example, the first preset duration may be 0.5 ms.

In the foregoing process, the node device obtains historical state data once from the data queue every first preset duration. However, historical state data in the data queue is disordered. Therefore, the following step 203 needs to be performed, to sort the historical state data and then add the sorted historical state data to a transmission buffer, thereby asynchronously writing the historical state data into the transmission buffer.

In some embodiments, the node device may further synchronously write the historical state data into the transmission buffer. The synchronization process is to synchronously add the historical state data to the transmission buffer every time a piece of historical state data is newly added to the data queue. Based on the situation that the historical state data is synchronously written into the transmission buffer, if the node database is a database that does not support storage of historical state data, the node device may write the historical state data into the data queue at a moment at which commitment of the transaction is completed, and write the historical state data into the transmission buffer at the same moment.

In the foregoing process, step 202 to step 204 in this embodiment may be replaced with the following steps: adding, when it is detected that any historical state data is added to the data queue, the historical state data to the transmission buffer; and replicating, when it is detected that any historical state data is added to the transmission buffer, the at least one piece of historical state data in the transmission buffer to the cluster device, thereby implementing synchronous replication of the historical state data, and ensuring that the historical state data is written into the transmission buffer according to an order of transaction commitment timestamps and an order of transaction identifiers. Therefore, the sorting operation in step 203 does not need to be performed, and the following step 204 is directly performed.

In some scenarios, if generation of the historical state data and the process of adding the historical state data to the data queue are asynchronous, for example, the historical state data is purged by the node database of a type of MySQL or InnoDB involved in step 201 by using the PURGE operation, or the historical state data is purged by the node database of a type of PostgreSQL by using the VACUUM operation, historical state data cached in the data queue is disordered. Consequently, even if the historical state data is synchronously written into the transmission buffer, it still cannot be ensured that the historical state data is orderly written into the transmission buffer. Therefore, the following step 203 needs to be performed in such a scenario.

Figure 5:
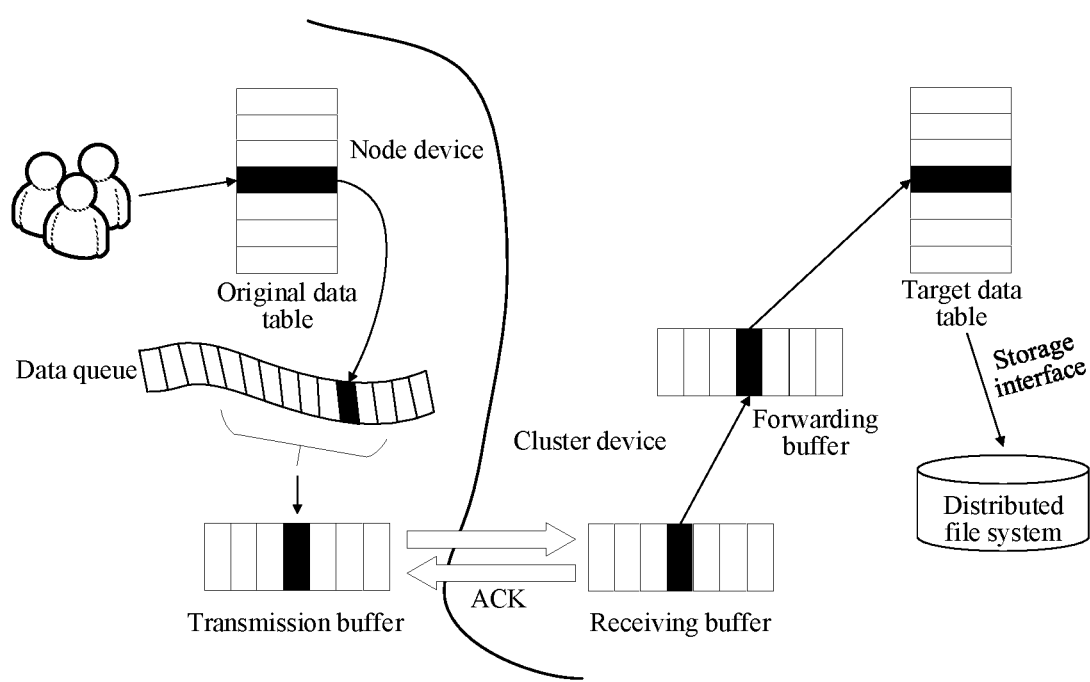
FIG. 5 is a schematic principle diagram of a stream replication technology according to an embodiment of this application.

FIG. 5 is a schematic principle diagram of a stream replication technology according to an embodiment of this application. Referring to FIG. 5, after a commitment operation of any transaction is detected, original current state data may be converted into historical state data. In this case, the historical state data in an original data table is first added to a data queue, and the historical state data in the data queue is then asynchronously added to a transmission buffer based on the operation in step 202. However, historical state data obtained from the data queue every first preset duration is disordered. Therefore, to ensure that the historical state data can be orderly written into the transmission buffer, the following step 203 needs to be performed.

203. The node device sorts the at least one piece of historical state data according to transaction commitment timestamps in ascending order, sorts, when there are a plurality of pieces of historical state data having the same transaction commitment timestamp, the plurality of pieces of historical state data according to transaction identifiers in ascending order, to obtain at least one piece of orderly arranged historical state data, and adds the at least one piece of orderly arranged historical state data to the transmission buffer.

Each piece of historical state data corresponds to one transaction. A transaction identifier (transaction ID) is used for uniquely identifying a transaction. Transaction identifiers are monotonically increased according to transaction generation timestamps. For example, the transaction identifiers may be the transaction generation timestamps. Certainly, the transaction identifiers may be alternatively values monotonically increased according to values of the transaction generation timestamps. One transaction usually corresponds to two timestamps, that is, a transaction generation timestamp and a transaction commitment timestamp. The two timestamps respectively correspond to a generation moment and a commitment moment of the transaction.

The transmission buffer may be a part that is cyclically used in the data replication process. The transmission buffer may be a buffer invoked when a transmission task (which is to transmit the historical state data from the node device to the cluster device) is performed in a transmission process or a transmission thread. In some embodiments, there may be one or more transmission processes or transmission threads, and therefore, there may also be one or more transmission buffers. In step 203, description is made by using only an example in which the historical state data is orderly written into any transmission buffer.

In the foregoing process, before asynchronously writing the historical state data into the transmission buffer, the node device may sort the historical state data. During sorting, the historical state data is first sorted according to transaction commitment timestamps in ascending order, and then historical state data having the same transaction commitment timestamp is sorted according to transaction identifiers in ascending order, so as to write the orderly arranged historical state data into the transmission buffer, ensuring that the historical state data in the transmission buffer is absolutely ordered.

Figures 6, 7, 8:
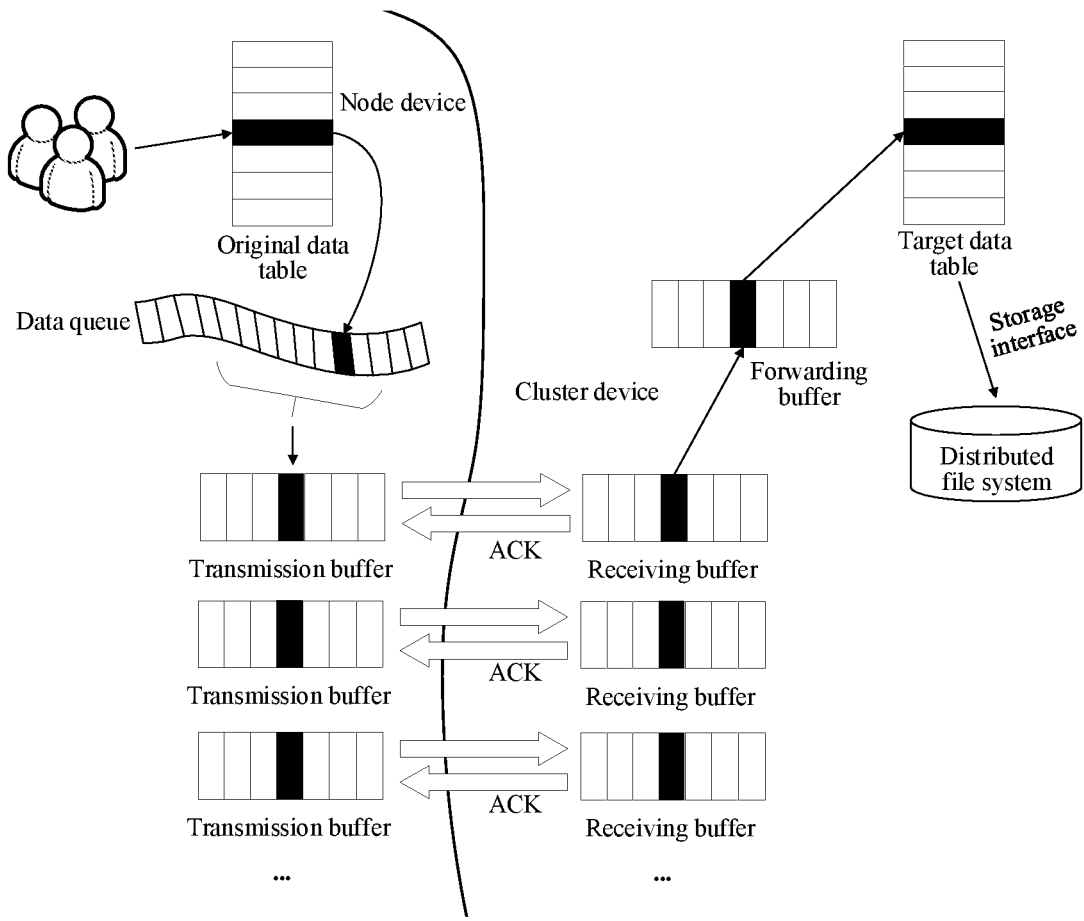
FIG. 6 is a schematic principle diagram of a stream replication technology according to an embodiment of this application.
FIG. 7 is a schematic structural diagram of an original data table according to an embodiment of this application.
FIG. 8 is a schematic structural diagram of a target data table according to an embodiment of this application.

FIG. 6 is a schematic principle diagram of a stream replication technology according to an embodiment of this application. Referring to FIG. 6, when there are a plurality of transmission buffers, a method used by each transmission buffer for obtaining historical state data is similar to the implementation described in step 202 and step 203. Details are not described herein again. In step 202 and step 203, the node device adds the at least one piece of historical state data in the data queue to any one of the at least one transmission buffer. In a scenario with a large data volume, the historical state data in the data queue may be added to the transmission buffers more quickly by increasing a quantity of the transmission buffers.

In some embodiments, when there are a plurality of transmission buffers, the node device may evenly add historical state data from the same original data table in the data queue to the plurality of transmission buffers, thereby improving the utilization of the plurality of transmission buffers, and improving a rate of transmitting the historical state data in the original data table.

In some embodiments, after adding the historical state data in the data queue to the transmission buffer, the node device may mark the historical state data reusable in the data queue according to actual requirements, so that the node device locally dumps the historical state data.

204. In a case that a first preset condition is met, the node device replicates the at least one piece of historical state data in the transmission buffer to the cluster device.

In some embodiments, the first preset condition may be that the node device detects that any historical state data is added to the transmission buffer. The transmission buffer is configured for caching to-be-replicated historical state data. In the process in which the node device obtains historical state data from the data queue, once a piece of historical state data is successfully added to the transmission buffer, the historical state data in the transmission buffer is replicated to the cluster device, so that historical state data can be continuously replicated to the cluster device. Such a data replication technology is referred to as a stream replication technology.

In some embodiments, the first preset condition may be further that the node device detects that a proportion of an amount of used data in the transmission buffer to a capacity of the transmission buffer reaches a proportion threshold. In the process in which the node device obtains historical state data from the data queue, once a proportion of an amount of used data in the transmission buffer to a total capacity of the transmission buffer reaches a proportion threshold, the historical state data cached in the transmission buffer is replicated to the cluster device, so that historical state data can be continuously replicated to the cluster device.

The proportion threshold may be any value that is greater than 0 and less than or equal to 1. For example, the proportion threshold may be a value such as 100% or 75%.

In some embodiments, the first preset condition may be further that a duration between the current moment and a previous moment at which historical state data in the transmission buffer is replicated to the cluster device reaches a second preset duration. In the process in which the node device obtains historical state data from the data queue, once a duration between the current moment and a previous moment at which historical state data is replicated reaches a second preset duration, the historical state data in the transmission buffer is replicated to the cluster device, so that historical state data can be continuously replicated to the cluster device.

The second preset duration may be any value greater than or equal to the first preset duration. For example, if the first preset duration is 0.5 ms, the second preset duration may be 1 ms. In this case, data in the transmission buffer is replicated to the cluster device once every 1 ms. During the 1-ms duration, the node device obtains historical state data (which may be one or more) newly added to the data queue within a former 0.5-ms duration from the data queue every 0.5 ms.

In some embodiments, the first preset condition may be further that a duration between the current moment and a previous moment at which historical state data in the transmission buffer is replicated to the cluster device reaches a third preset duration. The third preset duration is the same preset duration configured for each of the plurality of node devices, and the third preset duration is greater than the second preset duration. In a process in which the plurality of node devices respectively perform data replication, the plurality of node devices simultaneously perform a data replication task once every third preset duration, to control a maximum delay among moments at which data replication operations are performed by the node devices to be not greater than the third preset duration.

In some embodiments, the first preset condition may be further that the node device detects that a proportion of an amount of used data in the transmission buffer to a capacity of the transmission buffer reaches a proportion threshold, or a duration between the current moment and a previous moment at which historical state data in the transmission buffer is replicated to the cluster device reaches a second preset duration. That is, in the data replication process, once a proportion of an amount of used data in the transmission buffer to a total capacity of the transmission buffer reaches a proportion threshold, the data replication task is performed once. Alternatively, even if the proportion of the amount of the used data in the transmission buffer to the capacity of the transmission buffer has not reached the proportion threshold, but a duration between the current moment and a previous moment at which historical state data in the transmission buffer is replicated to the cluster device reaches a second preset duration, the data replication task is still performed once.

In the foregoing process, the node device may transmit the at least one piece of historical state data in the transmission buffer to the cluster device based on a transmission process or a transmission thread. In some embodiments, the node device may alternatively transmit, when the first preset condition is met, all historical state data cached in the transmission buffer to the cluster device at a time. The foregoing step 202 to step 204 form a cyclic process, so that the node device can continuously replicate historical state data to the cluster device based on a stream replication technology.

In some embodiments, each historical state data in the transmission buffer that is transmitted to the cluster device may include at least one of a transaction identifier of a transaction corresponding to the historical state data, node identifiers of one or more node devices corresponding to one or more sub-transactions of the transaction, and full data of the historical state data.

One transaction may include at least one sub-transaction, each sub-transaction corresponds to one node device, and each node device has a unique node identifier. The node identifier may be an Internet Protocol address (IP address) of the node device, or may be an identification number of the node device. Identification numbers and IP addresses are in a one-to-one mapping relationship. Any node device in the TP cluster may store the mapping relationship, and certainly, the cluster device in the AP cluster may also store the mapping relationship.

In some embodiments, the node identifiers of the one or more node devices may be encoded by using bitmap code, dictionary compression, or in another manner, so that a length of the historical state data transmitted by the node device becomes shorter, so as to further reduce resources occupied by data transmission.

In some embodiments, the foregoing data replication process may be implemented by using a Checkpoint operation of the TP cluster. A Checkpoint operation frequency of the TP cluster may be further set for the node device. The operation frequency is used for indicating a frequency at which the TP cluster performs the Checkpoint operation. For example, the operation frequency may be that the Checkpoint operation is performed once every 1s. In the Checkpoint operation, each node device in the TP cluster performs the data replication process in step 204 once, so that all historical state data newly generated in the TP cluster may be dumped into the AP cluster at a time. That is, the Checkpoint operation frequency actually corresponds to the third preset duration.

In some embodiments, when there are many node devices in the TP cluster, if each node device in the TP cluster is still traversed to perform the Checkpoint operation once, a duration consumed by data replication from the TP cluster to the AP cluster may be significantly increased, and a jolt of the performance of the HTAC further occurs, affecting the stability and robustness of the HTAC. Therefore, for each node device in the TP cluster, a "micro-Checkpoint" operation may be performed. A micro-Checkpoint operation frequency is greater than the Checkpoint operation frequency, so that the historical state data of the node device can be quickly dumped into the AP cluster, thereby meeting an obtaining requirement of the AP cluster for historical state data, ensuring the replication efficiency of historical state data, and improving the real-time usability of the AP cluster.

For example, the micro-Checkpoint operation frequency may be set to one-thousandth of a time unit of the Checkpoint operation frequency. That is, if the Checkpoint operation is performed once every 1 s, the micro-Checkpoint operation is performed once every 1 ms. Certainly, the micro-Checkpoint operation frequency is described herein only by using an example. A proportion of the micro-Checkpoint operation frequency to the Checkpoint operation frequency is not specifically limited in the embodiments of this application.

In the foregoing situation, the micro-Checkpoint operation frequency actually corresponds to the second preset duration. Different micro-Checkpoint operation frequencies may be set for different node devices. The micro-Checkpoint operation frequency may be in a positive correlation with a quantity of active transactions of a node device per second. For example, a relatively high micro-Checkpoint operation frequency may be set for node devices having top 10 quantities of active transactions per second in the TP cluster. Certainly, even if the same micro-Checkpoint operation frequency is set for different node devices, because proportions of amounts of used data in transmission buffers of the different node devices to total capacities of the transmission buffers usually do not reach the proportion threshold simultaneously, micro-Checkpoint operations of the different node devices are asynchronous.

In some embodiments, while different node devices in the TP cluster respectively perform micro-Checkpoint operations, all the node devices in the TP cluster may be further forced to periodically perform the Checkpoint operation once, to avoid that the real-time usability of the AP cluster is affected because a data delay caused by the asynchronous micro-Checkpoint operations of the different node devices in the TP cluster is excessively large. For example, each node device performs the micro-Checkpoint operation once every 1 ms, and the TP cluster traverses all the node devices every 1 s, and performs the Checkpoint operation once, ensuring that a maximum data delay for the AP cluster to receive historical state data is not greater than 1 s (which is not greater than the Checkpoint operation frequency).

Further, the data replication process in step 204 may be alternatively divided into synchronous replication and asynchronous replication. In synchronous replication, data replication is tightly related to a purge operation of historical state data. A purge transaction corresponding to each purge operation (for example, a PURGE operation or a VACUUM operation) initiates stream replication of historical state data once at a commitment stage, that is, the node device first synchronizes all to-be-purged historical state data to the cluster device before the purge operation is completed. The cluster device replays a redo log of metadata in the data replication process based on an algorithm for recovery and isolation exploiting semantics (ARIES), and the node device sets a state of the purge transaction to "committed" only after replay is completed, so that the historical state data can be quickly replicated to the cluster device, thereby greatly ensuring the security of the historical state data.

The historical state data purged from the original data table can be replicated based on a stream replication technology. However, in some embodiments, only a redo log of metadata of current data replication may be recorded and replayed, to implement verification and checking between the node device and the cluster device again, which can ensure the security of the current data replication process to a greater extent. In this case, replay of the redo log performed for the purged historical state data in the original data table one by one may be still avoided, thereby reducing a data volume in the replay process, shortening a duration consumed by the replay process, and improving the efficiency of data replication.

In some embodiments, the data replication process may be alternatively asynchronous. In this case, data replication is not related to commitment of the purge transaction. The purge transaction of the node device does not initiate stream replication of historical state data at the commitment stage, and stream replication between the node device and the cluster device is initiated according to the second preset duration specified by the first preset condition. Historical state data in the node device that is modified in a time interval between two times of stream replication is replicated to the cluster device, thereby reducing data transmission resources occupied in the data replication process.

In step 204, confirmation of completed transactions of data replication is further involved. In this case, there may be three types of confirmation levels, which are respectively a replay confirmation level, a receiving confirmation level, and a transmission confirmation level. Details are described below:

In the replay confirmation level, only after the node device receives a replication success response of the cluster device, the node device considers that the data replication task is completed once, thereby implementing strong synchronization in the data replication process. Strong synchronization can ensure that each data replication is atomic, that is, the entire data replication process either succeeds or fails without any intermediate state. Once an abnormality occurs in any link, it is considered that the current data replication fails, and the entire current data replication needs to be redid, ensuring the security of the data replication process. In some embodiments, the replication success response may be an "Applied" instruction.

In the receiving confirmation level, once the node device receives a data receiving response of the cluster device, the node device considers that the data replication task is completed once, thereby implementing weak synchronization in the data replication process. Weak synchronization can ensure that all the remaining operations in the data replication process other than metadata replay of the cluster device are atomic. In this case, even if the metadata fails to be replayed, the entire current data replication is not redid, ensuring the security of the data replication process to a specific extent while taking account of the efficiency of data replication. In some embodiments, the data receiving response may be a "Received" instruction.

In the transmission confirmation level, once the node device completes a data transmission operation, the node device considers that the data replication task is completed once. In this case, although it cannot be ensured that the data replication process is atomic, the node device and the cluster device do not affect each other. When the cluster device responds to break down or be in another abnormal situation, the node device is not blocked from initiating data replication again. When the cluster device has more than one stand-alone device, even if a fault occurs in one stand-alone device, data replication processes of the remaining stand-alone devices may be still performed normally, thereby ensuring the efficiency of data replication.

205. The cluster device receives, from a receiving buffer, the at least one piece of historical state data transmitted by the node device, the receiving buffer being configured for caching received historical state data.

The receiving buffer may be a part that is cyclically used in the data replication process. The receiving buffer may be a buffer invoked when a receiving task (which is to receive the historical state data transmitted by the node device) is performed in a receiving process or a receiving thread. In some embodiments, because there may be one or more receiving processes or receiving threads, there may also be one or more receiving buffers. A description is made by using one receiving buffer as an example in the embodiments of this application. Other receiving buffers have processes similar to the process of receiving historical state data. Details are not described herein again.

In some embodiments, one receiving buffer may correspond to one node device. In this case, step 205 is: the cluster device determines a receiving buffer corresponding to the node device in at least one receiving buffer, and caches, based on a receiving process or a receiving thread, the at least one piece of historical state data transmitted by the node device to the receiving buffer, so that a receiving buffer can receive historical state data from the same node device in a targeted manner.

Certainly, there may be alternatively no correspondence between the receiving buffer and the node device. The cluster device allocates data receiving tasks according to a currently usable storage space of the receiving buffer. In this case, step 205 is: the cluster device determines, in at least one receiving buffer, a receiving buffer having a maximum storage space that is currently usable, and caches, based on a receiving process or a receiving thread, the at least one piece of historical state data transmitted by the node device to the receiving buffer, so that the cluster device can add historical state data to the receiving buffer having the maximum storage space that is currently usable, thereby properly utilizing cached resources.

206. The cluster device adds the at least one piece of historical state data in the receiving buffer to a forwarding buffer, and converts, by using the forwarding buffer, the at least one piece of historical state data into data meeting a tuple format, to obtain at least one data item, the forwarding buffer being configured for performing data format conversion on historical state data.

In the foregoing process, the process in which the receiving buffer adds (that is, replicates) the historical state data to the forwarding buffer may include two manners: synchronous replication and asynchronous replication.

In the process of synchronous replication, every time the cluster device receives historical state data (there may be one or more pieces of historical state data, but all the historical state data is transmitted by the node device at a time) from the receiving buffer, the cluster device immediately replicates the historical state data to the forwarding buffer.

In the process of asynchronous replication, the cluster device receives historical state data from the receiving buffer, and replicates all the historical state data received from the receiving buffer to the forwarding buffer every fourth preset duration. The fourth preset duration is any value greater than or equal to 0.

In some embodiments, if the node device performs the micro-Checkpoint operation once every second preset duration, step 206 is: the cluster device receives, from the receiving buffer every second preset duration, at least one piece of historical state data transmitted by the node device. Certainly, the same process is performed for any node device, and second preset durations of different node devices may be the same, or may be different.

In some embodiments, if all the node devices in the TP cluster perform the Checkpoint operation once every third preset duration, step 206 is: the cluster device receives, from the receiving buffer every third preset duration, at least one piece of historical state data simultaneously transmitted by a plurality of node devices. Therefore, it is ensured that a data delay among different node devices in the TP cluster is not greater than the third preset duration, thereby improving the real-time usability of the AP cluster for storing historical state data.

In some embodiments, regardless of synchronous replication or asynchronous replication, after the historical state data is successfully replicated to the forwarding buffer, the historical state data that is currently replicated is cleared in the receiving buffer, so that a cache space can be obtained in time through purging to store new historical state data, thereby speeding up data transmission.

In step 206, a format of the at least one piece of historical state data transmitted by the node device is a compressed data format. Therefore, the at least one piece of historical state data in the forwarding buffer needs to be restored to original data meeting a tuple format, to make it convenient to perform the following step 207. In some embodiments, the data meeting a tuple format may be data of a row format.

207. The cluster device stores the at least one data item in at least one target data table of a cluster database, one target data table being corresponding to one original data table in which one data item is located in the node device.

In the foregoing step, the target data table may include two storage formats according to different service requirements. Therefore, when the cluster device stores the at least one data item in the target data table, there are also two corresponding storage processes. Details are described below:

In some embodiments, for a data item in tuple, the cluster device may store, according to a storage format in an original data table in which the data item is located, the data item in a target data table corresponding to the original data table, to enable storage formats of the target data table and the original data table to be exactly the same, thereby making it convenient to track a life cycle of a tuple in a general situation.

In the foregoing process, to ensure that formats of the original data table and the target data table are consistent, when any node device establishes a connection to the cluster device, target data tables corresponding to original data tables in the node device may be created in the cluster device by using a logical replication technology (such as a BinLog technology of MySQL) or a physical replication technology (such as a redo log-based replication technology of PostgreSQL). The original data table is used for storing current state data of a plurality of tuples, and the target data table corresponding to the original data table is used for storing historical state data of the plurality of tuples.

In the BinLog (a binary log, also referred to as a logic log) technology, BinLog is used for recording operations in a database. In BinLog, transaction operations in a database such as data modification and table structure modification are described in a specific format. A transaction operation that can be recorded in BinLog usually has been committed or rolled back. A description is made below by using the logical replication technology of the MySQL database as an example. After a node device establishes a connection to the cluster device, the node device may maintain one or more Dump-Threads. One Dump-Thread is used for docking with one cluster device. When logical replication is performed between the node device and the cluster device, the following steps may be performed:

The cluster device transmits information about synchronized Binlog (including the name of a data file and a location in the data file) to the node device, the node device determines a currently synchronized location according to the information about synchronized Binlog. The Dump-Thread of the node device transmits Binlog data of metadata that is not synchronized to the cluster device. The cluster device receives, by using an input/output thread (IO-Thread), the Binlog data synchronized by the node device, and writes the Binlog data into a file where Relay-Log is located. The cluster device reads the Binlog data from the Relay-Log file by using SQL-Thread, and executes an SQL statement obtained after decoding the Binlog data, so that metadata of the node device may be incrementally replicated to the cluster device.

In some embodiments, for a data item indicating a field change status, the cluster device may store the data item in a target data table corresponding to an original data table according to a storage format of a key-value pair. Therefore, not only information originally carried in the data item may be reserved, but also a change status of historical state data of any field may be tracked in a customized manner by using the storage format of the key-value pair.

In the process of storing the data item in a key-value pair format, a key and a value in the target data table need to be determined. In some embodiments, the key may be determined specifically by performing the following operation: determining, by the cluster device, at least one of a key of the data item in the original data table and a generation time of the data item as a key of the data item in the target data table. In some embodiments, when a key exists in the original data table, the key in the original data table and a generation time of the data item may be determined as a key in the target data table, so that a change status of historical state data can be tracked from different dimensions. Certainly, if no key exists in the original data table, the generation time of the data item may be directly determined as the key in the target data table, so that the generation time of the data item can be intuitively recorded.

In some embodiments, the value may be further determined by performing the following operation: determining, by the cluster device, a changed field of the data item in the original data table as a value of the data item in the target data table. A format of the changed field is similar to a character string format, and a storage format of each changed field may be "key: old value, new value". In some embodiments, there may be one or more changed fields. If a plurality of fields are simultaneously changed, the changed fields may be separated by using semicolons.

For example, FIG. 7 is a schematic structural diagram of an original data table according to an embodiment of this application. Referring to FIG. 7, description is made by using a data item indicating a field change status as an example. There are four keys in the original data table, which are respectively a server number, a server status, a responsible department, and a region. It is assumed that in a transaction operation, the "server status" and the "responsible department" of the data item are changed. FIG. 8 is a schematic structural diagram of a target data table according to an embodiment of this application. Referring to FIG. 8, dynamic change statuses of the "server status", the "responsible department", and an operation time may be intuitively seen from the target data table. Because the "region" of the data item is not changed, a change status of the "region" does not need to be displayed in the target data table. In this case, a storage format of each value in the target data table may be "server status: providing services, service interruption; responsible department: department A, department B".

In some embodiments, the cluster device may further upload the data item in the forwarding buffer to a distributed file system for persistent storage by using a storage process or a storage thread through a storage interface, to implement unlimited storage of the historical state data.

A description is made by using an example in which the distributed file system is Ceph, and the cluster database of the cluster device is MySQL. Ceph may be mounted on MySQL in two manners. For example, configuration may be completed by mounting CephFS. In this case, assuming that the cluster device includes a monitor device (node 1) and two stand-alone devices (node 2 and node 3), the following steps may be specifically performed:

First, the cluster device creates a directory and prepares a bootstrap keyring file, which may be implemented by using a command of "sudo mkdir-p/var/lib/ceph/mds/ceph-localhost". After the directory is created, Ceph automatically generates the bootstrap keyring file on the node 1 where the monitor device is located. In this case, the bootstrap keyring file needs to be replicated to the node 2 and the node 3, where replication may be performed by using a command of "/var/lib/ceph/bootstrap-osd/ceph.keyring". A description is described herein by using an example in which the cluster device includes two stand-alone devices. If the cluster device includes more than two stand-alone devices, and CephFS further needs to be mounted on another stand-alone device, the bootstrap keyring file is replicated to the stand-alone device.

Next, the cluster device generates a done file and a sysvinit file. In some embodiments, the cluster device may generate a done file by using a statement of "sudo touch/var/lib/ceph/mds/ceph-mon1/done" and may generate a sysvinit file by using a statement of "sudo touch/var/lib/ceph/mds/ceph-mon1/sysvinit".

Next, the cluster device generates a keyring file of mds. In some embodiments, the cluster device may generate a keyring file by using a statement of "sudo ceph auth get-or-create mds.mon1 osd 'allow rwx' mds 'allow' mon 'allow profile mds'-o/var/lib/ceph/mds/ceph-mon1/keyring".

Next, the cluster device creates pool of Cephfs. In some embodiments, the cluster device may create data of pool of Cephfs by using a statement of "ceph osd pool create cephfs_data 300", and create metadata of pool of Cephfs by using a statement of "ceph osd pool create cephfs_metadata 300".

Next, the cluster device starts an MDS file (a mirror image file). In some embodiments, the cluster device may start MDS by using a statement of "sudo/etc/init.d/ceph start stop mds.localhost".

Finally, the cluster device creates Cephfs and mounts Cephfs. In some embodiments, the cluster device may create Cephfs by using a statement of "ceph fs new cephfs cephfs_metadata cephfs_data". After creation is completed, the cluster device may complete mounting of Cephfs by using a statement of "mount-t ceph [mon ip]:6789://mnt/mycephfs".

In some embodiments, the cluster device may further complete configuration by mounting RBD (a mirror image file) of Ceph. The following steps may be specifically performed:

First, the cluster device creates pool of RBD, for example, by using a statement of "ceph osd pool create rbd 256".

Next, the cluster device creates myrbd of an RBD block device (that is, requests a block storage space), for example, by using a statement of "rbd create rbd/myrbd--size 204800-m [mon ip]-k/etc/ceph/ceph.client.admin.keyring".

Next, the cluster device creates RBD mapping, and obtains a device name, that is, maps RBD to the monitor device. For example, the cluster device may perform mapping by using a statement of "sudo rbd map rbd/myrbd--name client.admin-m [mon ip]-k/etc/ceph/ceph.client.admin.key ring", and simultaneously obtain the name of the monitor device. A description is made herein by using an example in which RBD is mounted on the monitor device. Actually, if RBD is mounted on a stand-alone device, an operation of mapping RBD to the stand-alone device and obtaining the name of the stand-alone device is performed.

Finally, the cluster device creates a file system according to the obtained device name, and mounts RBD. For example, the cluster device may create the file system by using a statement of "sudo mkfs.xfs/dev/rbd1" and mount RBD by using a statement of "sudo mount/dev/rbd1/mnt/myrbd".

In some embodiments, not only the cluster device may access the distributed file system by using the storage interface, but also any node device in the TP cluster may access the distributed file system by using the storage interface. Both the cluster device and the node device in the TP cluster may complete configuration in a manner similar to the foregoing mounting manner. Details are not described herein again.

208. The cluster device transmits a replication success response to the node device.

In the foregoing process, after the cluster device successfully stores the historical state data in the target data table, the cluster device may transmit one piece of acknowledgement (ACK) data to the node device. The ACK data is a transmission-type control character, and is used for indicating that the historical state data transmitted by the node device has been successfully replicated.

209. In a case that the node device receives the replication success response transmitted by the cluster device, the node device clears the transmission buffer corresponding to the replication success response.

In the foregoing process, only after receiving the replication success response, the node device allows the transmission buffer to be cleared, ensuring strong synchronization between the node device and the cluster device, and ensuring the security of the data replication process.

Any combination of the foregoing optional technical solutions may be used to form an optional embodiment of the present disclosure. Details are not described herein again.

In the method provided in the embodiments of this application, when a commitment operation of a transaction is detected, historical state data of the transaction is added to a data queue, to cache the historical state data of the transaction into the data queue. At least one piece of historical state data in the data queue is added to a transmission buffer, so that a transmission process or a transmission thread is performed based on the transmission buffer. In a case that a first preset condition is met, the at least one piece of historical state data in the transmission buffer is replicated to a cluster device, so that a node device can replicate historical state data in the transmission buffer to the cluster device every time the first preset condition is met. In this way, the node device does not need to convert an original historical state data format into a log format, and the cluster device does not need to parse a log into an original data format for storage. Therefore, the redo log does not need to be replayed for historical state data during data replication, avoiding a cumbersome replay procedure, shortening a duration of a replay process of the redo log, and improving the efficiency of the data replication process.

Further, the node device synchronously replicates the historical state data, ensuring that the historical state data may be replicated to the cluster device according to a commitment order of transactions, avoiding performing the step of sorting the historical state data, and simplifying the procedure of the stream replication process. Certainly, the node device may further asynchronously replicate the historical state data in the data queue to the transmission buffer, to add the historical state data in the data queue to the transmission buffer in batches, avoiding frequently performing a replication operation on the historical state data, and further avoiding affecting the processing efficiency of the node device. However, before asynchronous replication, the historical state data needs to be sorted, to ensure that the historical state data is orderly added to the transmission buffer, thereby making it convenient for the cluster device to subsequently obtain a minimum transaction identifier.

Further, if the first preset condition is met, the historical state data in the transmission buffer is replicated to the cluster device. After replication succeeds, the transmission buffer is cleared. Afterward, processes of adding the historical state data to the transmission buffer and transmitting the historical state data are cyclically performed, so that the historical state data of the node device can be continuously replicated to the cluster device, thereby avoiding replaying the redo log for the historical state data, and improving the efficiency of the data replication process.

Further, when there are a plurality of transmission buffers, the node device may evenly add historical state data from the same original data table in the data queue to the plurality of transmission buffers, thereby improving the utilization of the plurality of transmission buffers, and improving a rate of transmitting the historical state data in the original data table.

Further, when the first preset condition is that the node device detects that any historical state data is added to the transmission buffer, synchronous replication of data replication can be implemented, thereby ensuring the real-time performance of the replication process of the historical state data. When the first preset condition is that the node device detects that a proportion of an amount of used data in the transmission buffer to a capacity of the transmission buffer reaches a proportion threshold, the proportion of the amount of the used data in the transmission buffer to the capacity of the transmission buffer can be effectively controlled to be less than the proportion threshold, thereby improving the efficiency of the data replication process. When the first preset condition is that a duration between the current moment and a previous moment at which historical state data in the transmission buffer is replicated to the cluster device reaches a second preset duration, a maximum time interval between two times of data replication can be controlled, thereby ensuring the real-time performance of the replication process of the historical state data. When the first preset condition is that a duration between the current moment and a previous moment at which historical state data in the transmission buffer is replicated to the cluster device reaches a third preset duration, because the third preset duration is the same preset duration that all the node devices in the TP cluster have, delays of data replication processes of different node devices in the TP cluster can be controlled.

Further, after receiving, from a receiving buffer, at least one piece of historical state data transmitted by the node device, the cluster device may add the at least one piece of historical state data in the receiving buffer to a forwarding buffer, and convert, by using the forwarding buffer, the at least one piece of historical state data into data meeting a tuple format, to obtain at least one data item, so as to restore a format of the compressed historical state data. Because the historical state data maintained in the original format is directly obtained, an operation of parsing a log to obtain historical state data may be avoided. The at least one data item is stored in at least one target data table in a cluster database, so that the historical state data can be properly stored.

Further, the target data table in the cluster device may support two types of storage formats according to different service requirements. The cluster device may store a data item in tuple according to a storage format in an original data table, so as to track a life cycle of a tuple in a general situation. The cluster device may store, according to a storage format of a key-value pair, a data item indicating a field change status. In this way, not only information originally carried in the data item may be reserved, but also a change status of historical state data of any field may be tracked in a customized manner.

Further, in the process of storing a data item in a key-value pair format, the cluster device may determine at least one of a key of the data item in the original data table and a generation time of the data item as a key of the data item in the target data table. Therefore, a change status of the historical state data is tracked from different dimensions, and the generation time of the data item is intuitively recorded. Further, the cluster device determines a changed field of the data item in the original data table as a value of the data item in the target data table. Therefore, the changed field can be intuitively viewed, and a change status of historical state data of any field is tracked.

The foregoing embodiment provides a data replication method. In a case that a first preset condition is met, the node device can replicate historical state data to the cluster device based on a stream replication technology, thereby improving the security of the historical state data. After properly storing the historical state data, the cluster device may further provide a service such as querying or analyzing historical state data to the outside.

In the foregoing embodiment, it has been mentioned that one transaction may include one or more sub-transactions, and different sub-transactions may correspond to different node devices. Although the node device may perform the data replication process once every second preset duration, starting time points of different node devices may be different. Consequently, data replication between node devices may be asynchronous. Therefore, in some scenarios, for the same committed transaction, because node devices corresponding to one or more sub-transactions of the transaction are asynchronous in the data replication process, some node devices may have replicated historical state data corresponding to sub-transactions to the cluster device, but some node devices may not have replicated historical state data corresponding to sub-transactions to the cluster device. Consequently, the cluster device cannot completely read all historical state data affected by the same transaction, and an "inconsistency" problem occurs during data reading in the AP cluster.

Figure 9:
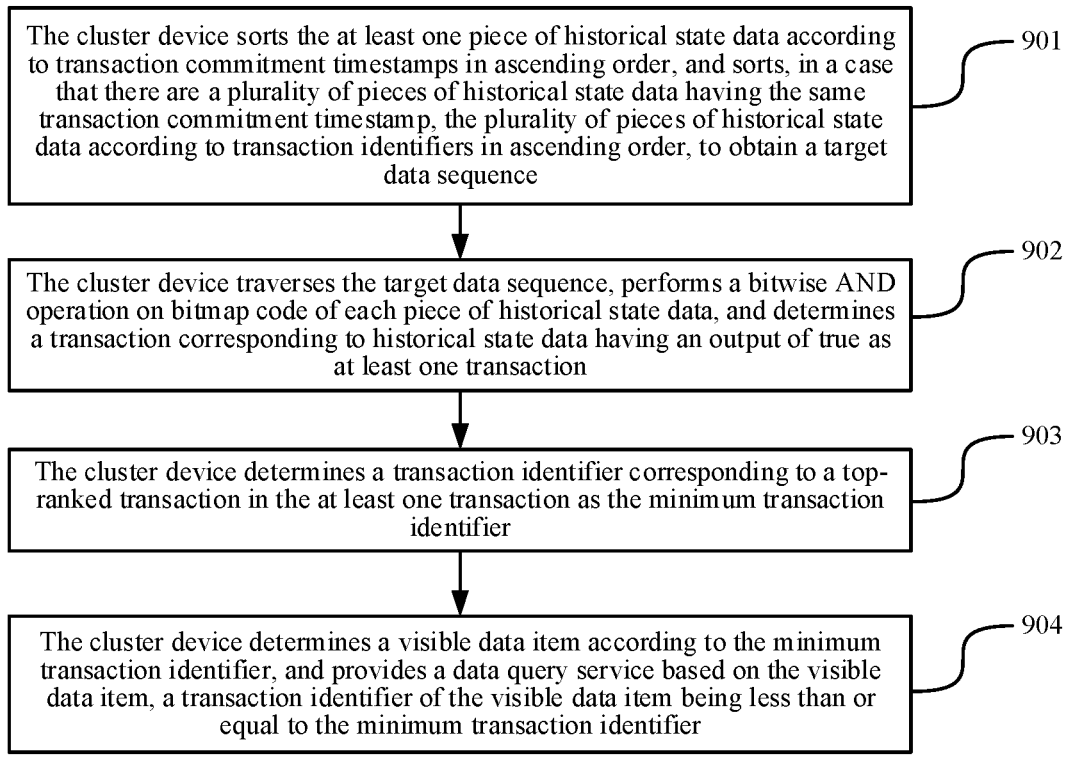
FIG. 9 is a flowchart of a data query process according to an embodiment of this application.

To resolve the "inconsistency" problem of reading in the cluster device, this application further provides a data query method. FIG. 9 is a flowchart of a data query process according to an embodiment of this application. Referring to FIG. 9, steps of reading the historical state data in the cluster device are as follows:

901. The cluster device sorts the at least one piece of historical state data according to transaction commitment timestamps in ascending order, and sorts, when there are a plurality of pieces of historical state data having the same transaction commitment timestamp, the plurality of pieces of historical state data according to transaction identifiers in ascending order, to obtain a target data sequence.

The sorting process refers to performing sorting according to values of transaction identifiers in ascending order. If a transaction precedes another transaction, a value of a transaction identifier of the transaction is less than a value of a transaction identifier of the another transaction. In transaction identifiers of different transactions, a later commitment moment of a transaction indicates a larger value of a transaction identifier of the transaction. Therefore, the values of the transaction identifiers are actually incremental according to timestamps of commitment moments. The sorting process in step 901 is similar to that in step 203. Details are not described herein again.

In the foregoing process, sorting is performed in at least one transmission buffer of each node device before data is transmitted. However, because the cluster device may be provided with at least one receiving buffer, although historical state data received by each receiving buffer is ordered (which may be regarded as a segment-ordered situation), it cannot be ensured that historical state data of all receiving buffers is ordered when combined. Therefore, the cluster device needs to perform step 901, to sort at least one piece of historical state data received by each receiving buffer. The at least one piece of historical state data is historical state data transmitted by a plurality of node devices.

In the foregoing process, because the TP cluster periodically performs a Checkpoint operation once, every time the cluster device receives at least one piece of historical state data transmitted in the Checkpoint operation from the at least one receiving buffer, the cluster device may sort the at least one piece of received historical state data, to obtain a target data sequence orderly arranged according to transaction commitment timestamps and transaction identifiers. In this case, to ensure the consistency of reading, the following step 902 and step 903 are performed.

902. The cluster device traverses the target data sequence, performs a bitwise AND operation on bitmap code of each piece of historical state data, and determines that a transaction corresponding to historical state data having an output of true meets the second preset condition.

It has been mentioned in step 204 that when any node device transmits historical state data to the cluster device, because one or more sub-transactions of a transaction correspond to one or more node devices, to record the node devices related to the transaction (that is, node devices corresponding to the sub-transactions), node identifiers of the one or more node devices may be encoded usually by using bitmap code, dictionary compression, or in another manner, so as to compress a length of the historical state data, thereby reducing resources occupied by data transmission.

The at least one transaction is a transaction meeting a second preset condition. The second preset condition is used for indicating that all data items corresponding to all sub-transactions of a transaction have been stored in the cluster database.

In step 902, the cluster device obtains at least one transaction meeting the second preset condition from the target data sequence. A manner for obtaining the at least one transaction depends on a manner in which the node device compresses the historical state data.

The foregoing process provides a method for determining at least one transaction meeting the second preset condition when the node device performs data compression by using bitmap code. That is, a bitwise AND operation is performed on each piece of historical state data in the target data sequence. If all bits are 1 (true), it indicates that a transaction corresponding to the historical state data meets the second preset condition. Because data items corresponding to all sub-transactions of the transaction have been stored in the cluster database, the at least one transaction may be referred to as an "alternative consistency point".

In some embodiments, if the node device performs data compression in a dictionary compression manner, step 902 may be further replaced with the following manner: the cluster device traverses the target data sequence to decode a compression dictionary of each piece of historical state data, to obtain a global transaction identifier corresponding to the each piece of historical state data, and determines, when it is determined that all data items of sub-transactions corresponding to the global transaction identifier have been stored in the cluster database, that a transaction corresponding to the global transaction identifier meets the second preset condition. Therefore, alternative consistency points can also be determined for dictionary compression, and a "minimum complete transaction ID" may be found from the alternative consistency points by using the following step 903.

If one transaction includes a plurality of sub-transactions, the transaction may be referred to as a "global transaction". If a transaction is a global transaction, it means that a plurality of sub-transactions involved in the transaction correspond to a plurality of node devices. Therefore, any global transaction may include two types of transaction identifiers, which are respectively a global transaction identifier and a local transaction identifier. The global transaction identifier is used for indicating unique identification information in all global transactions in the entire TP cluster. The local transaction identifier is used for indicating unique identification information in all transactions in each node device. For a global transaction, all sub-transactions have the same global transaction identifier, and the sub-transactions further have respective local transaction identifiers.

Based on the foregoing situation, the process of determining that all data items of sub-transactions corresponding to the global transaction identifier have been stored in the cluster database may be as follows: The cluster device obtains, according to the global transaction identifier, the data items that have been stored in the cluster database and have the global transaction identifier, and determines, when the obtained data items and the historical state data obtained through decoding correspond to all sub-transactions of the transaction, that all the data items of the sub-transactions corresponding to the global transaction identifier have been stored in the cluster database.

903. The cluster device determines a transaction identifier corresponding to a top-ranked transaction in the at least one transaction as the minimum transaction identifier.

In the foregoing process, because the cluster device has sorted the historical state data according to the transaction identifiers in ascending order in step 901, a transaction identifier corresponding to a top-ranked transaction in the at least one transaction may be directly obtained, so that the minimum transaction identifier in the transaction identifiers of the at least one transaction is obtained. The transaction identifiers in the node devices are incremental according to timestamps, so that the minimum transaction identifier is obtained. It means that a transaction that is the most complete (meeting the second preset condition) and has the minimum timestamp in the historical state data received in the current Checkpoint operation is obtained. The minimum transaction identifier may be referred to as a "minimum complete transaction ID", and a data item having a transaction ID less than the minimum transaction identifier may be regarded as a "micro-consistency point".

In step 901 to step 903, the cluster device determines the minimum transaction identifier meeting the second preset condition in the transaction identifiers of the at least one piece of historical state data. The second preset condition is used for indicating that all data items corresponding to all sub-transactions of a transaction have been stored in the cluster database, so that the minimum complete transaction ID in the current Checkpoint operation is found. In some embodiments, if a new minimum transaction identifier greater than a minimum transaction identifier determined in a previous Checkpoint operation cannot be found in the current Checkpoint operation, the minimum transaction identifier is not updated temporarily, but the operations performed in step 901 to step 903 are performed in a next Checkpoint operation of the TP cluster, and the following step 904 is performed after a new minimum transaction identifier is determined. Therefore, it may be ensured that in a process of constantly committing new transactions in the TP cluster, historical state data having a larger transaction identifier is constantly generated. These pieces of historical state data are dumped into the AP cluster by using the Checkpoint operation, and the AP cluster may constantly update a value of the minimum transaction identifier, to enable a value of the minimum complete transaction ID to be larger, which is similar to a rolling-forward process, thereby ensuring the real-time performance of a data query service provided by the AP cluster.

904. The cluster device determines a visible data item according to the minimum transaction identifier, and provides a data query service based on the visible data item, a transaction identifier of the visible data item being less than or equal to the minimum transaction identifier.

In step 904, the cluster device may make, based on a tuple visibility determining algorithm of the MVCC technology, a data item having a transaction identifier less than or equal to the minimum transaction identifier visible to the outside, thereby ensuring the reading consistency of the AP cluster in a micro-Checkpoint operation mechanism.

In some embodiments, when the cluster device provides a data query service based on the visible data item, the reading consistency of any read operation of full state data may be implemented. Because the reading consistency may be essentially regarded as transaction consistency constructed based on historical state data, it is ensured by implementing the reading consistency that historical state data at any time point read from the AP cluster is at a transaction consistency point.

Figure 10:
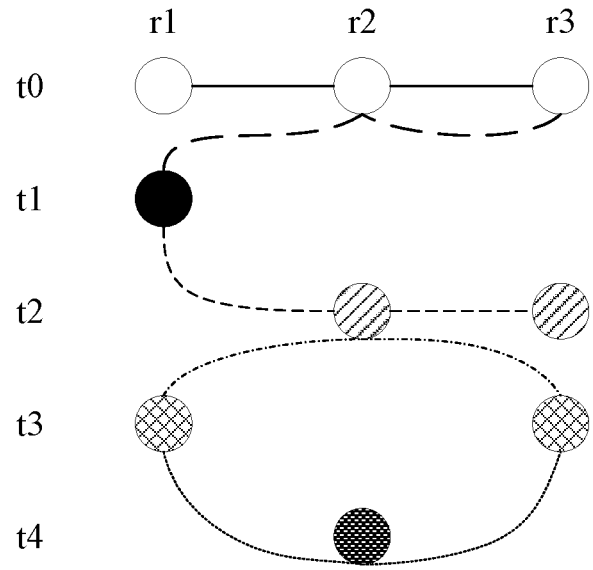
FIG. 10 is a schematic principle diagram of a transaction consistency point according to an embodiment of this application.

For example, FIG. 10 is a schematic principle diagram of a transaction consistency point according to an embodiment of this application. Referring to FIG. 10, it is assumed that there are three data items in the cluster database, which are respectively r1, r2, and r3 (the three may be distributed on different stand-alone devices in the AP cluster). An initial data status is indicated by using a white circle. In this case, r1, r2, and r3 are in a consistency state (indicated by using a solid line). When a new transaction occurs, a version of data is caused to change. For example, if a transaction T1 is committed at a moment t1, the data item r1 is changed, and a new version of r1 is generated and is indicated by using a black circle in the figure. Subsequently, if a transaction T2 is committed at a moment t2, the data items r2 and r3 are changed, and new versions of r2 and r3 are generated and are indicated by using oblique line circles in the figure. Subsequently, if a transaction T3 is committed at a moment t3, the data items r1 and r3 are changed, and new versions of r1 and r3 are generated and are indicated by using mesh circles in the figure. Subsequently, if a transaction T4 is committed at a moment t4, the data item r2 is changed, and a new version of r2 is generated and is indicated by using a lattice point circle in the figure. Through operations of the series of transactions T1 to T4, a total of five consistency states, that is, a solid line, a long-dashed line, a short-dashed line, a dash-dotted line, and a dotted line shown in the figure are generated by performing observation in a dimension of full state data. Each line segment may represent one consistency state. Therefore, if historical state data at a historical moment such as t1.5 or t3.5 needs to be queried, a data query service may be provided by using historical state data (all meeting transaction consistency) whose data versions shown by curves in the figure meet a consistency state.

In some embodiments, a user may perform routing query, based on a query statement, semantics of a query operation, and metadata that are provided in an SR layer in FIG. 1, to find any data stored in the TP cluster or the AP cluster. Certainly, the TP cluster mainly provides a query service for current state data, and the AP cluster mainly provides a query service for historical state data.

In some embodiments, when the TP cluster provides a query service for current state (or transitional state) data, transaction consistency of the current state (or transitional state) data may be ensured based on a distributed concurrency control algorithm. For example, the distributed concurrency control algorithm may be a concurrency control algorithm based on a locking technology, a concurrency control algorithm based on an optimistic concurrency control (OCC) technology, a concurrency control algorithm based on a time ordering (TO) technology, and a concurrency control algorithm based on an MVCC technology, or the like. The type of the distributed concurrency control algorithm is not specifically limited in the embodiments of this application.

In some embodiments, when the AP cluster provides a query service for historical state data, historical state data meeting a consistency condition may be read on the basis of transaction consistency.

In some embodiments, the entire HTAC architecture may further provide a hybrid query service, that is, one query operation is used for simultaneously querying current state data and historical state data of a tuple. The query operation is usually to designate a historical time point, and continuously read historical state data of tuples starting from this time point, until current state data at a current moment is found through query.

For example, hybrid query may be implemented based on the following statements:
SELECT
  [ALL | DISTINCT | DISTINCTROW]
  [HIGH_PRIORITY]
  [STRAIGHT_JOIN]
  [SQL_SMALL_RESULT] [SQL_BIG_RESULT] [SQL_BUFFER_RESULT]
  [SQL_CACHE | SQL_NO_CACHE] [SQL_CALC_FOUND_ROWS]
  select_expr [, select_expr . . . ]
  [FROM table_references
  [PARTITION partition_list]
  [WHERE where_condition]
  [GROUP BY {col_name | expr | position}
  [ASC | DESC], . . . [WITH ROLLUP]]
  [HAVING where_condition]
  [ORDER BY {col_name | expr | position}
  [ASC | DESC], . . . ]
  [LIMIT {[offset,] row_count | row_count OFFSET offset}]
  [PROCEDURE procedure_name(argument_list)]
  [INTO OUTFILE 'file_name'
  [CHARACTER SET charset_name]
  export_options
  | INTO DUMPFILE 'file_name'
  | INTO var_name [, var_name]]
  [FOR UPDATE | LOCK IN SHARE MODE]]

In the foregoing statements, a format of table_references may be a format as follows: tbl_name [[AS] alias] [index_hint] [SNAPSHOT START snapshot_name [TO snapshot_name2] [WITH type]].

SNAPSHOT is a transaction snapshot (different from a data snapshot of a data block), which may be briefly referred to as a snapshot. "[SNAPSHOT [START snapshot_name] [TO snapshot_name2] [WITH type]]" indicates that one snapshot interval is designated for one "tbl_name" object, and is content newly added based on a data query language (DQL). All clauses in the statements include (SNAPSHOT, START, TO), which indicates "differential snapshot reading", that is, reading is performed starting from one snapshot to another snapshot.

In the data query process provided in the embodiments of this application, the entire reading consistency in the HTAC architecture is ensured, that is, not only the reading consistency of the TP cluster is ensured, but also the reading consistency of the AP cluster is ensured. In the AP cluster, every time historical state data on which a Checkpoint operation is performed is received, an attempt is made to obtain a new minimum transaction identifier (a minimum complete transaction ID), that is, an attempt is made to update a value of the minimum transaction identifier. Based on a tuple visibility determining algorithm of the MVCC technology, a data item corresponding to a transaction having a transaction identifier less than the minimum transaction identifier is visible, ensuring the transaction consistency of historical state data stored in the AP cluster at a transaction level. When the HTAC further supports external consistency (including linear consistency, causal consistency, and the like), the external consistency and the transaction consistency may be wholly regarded as global consistency, so that any read operation initiated based on the HTAC architecture can meet the global consistency. Although the Checkpoint operation causes a specific data delay, it may be still regarded that the AP cluster meets a query requirement and a calculation requirement of an analysis service for the correctness and real-time performance of data approximately in real time.

The foregoing embodiment provides a process of performing data query after the data replication method is performed. In a case that a first preset condition is met, the node device can replicate historical state data to the cluster device based on a stream replication technology, so that the cluster device can provide a service such as querying or analyzing historical state data, thereby improving the security and the usability of the historical state data.

In some embodiments, if each node device in the TP cluster is traversed to perform the Checkpoint operation once, a duration consumed by data replication from the TP cluster to the AP cluster may be significantly increased, and a jolt of the performance of the HTAC further occurs, affecting the stability and robustness of the HTAC. Therefore, a micro-Checkpoint operation is introduced.

Figure 11:
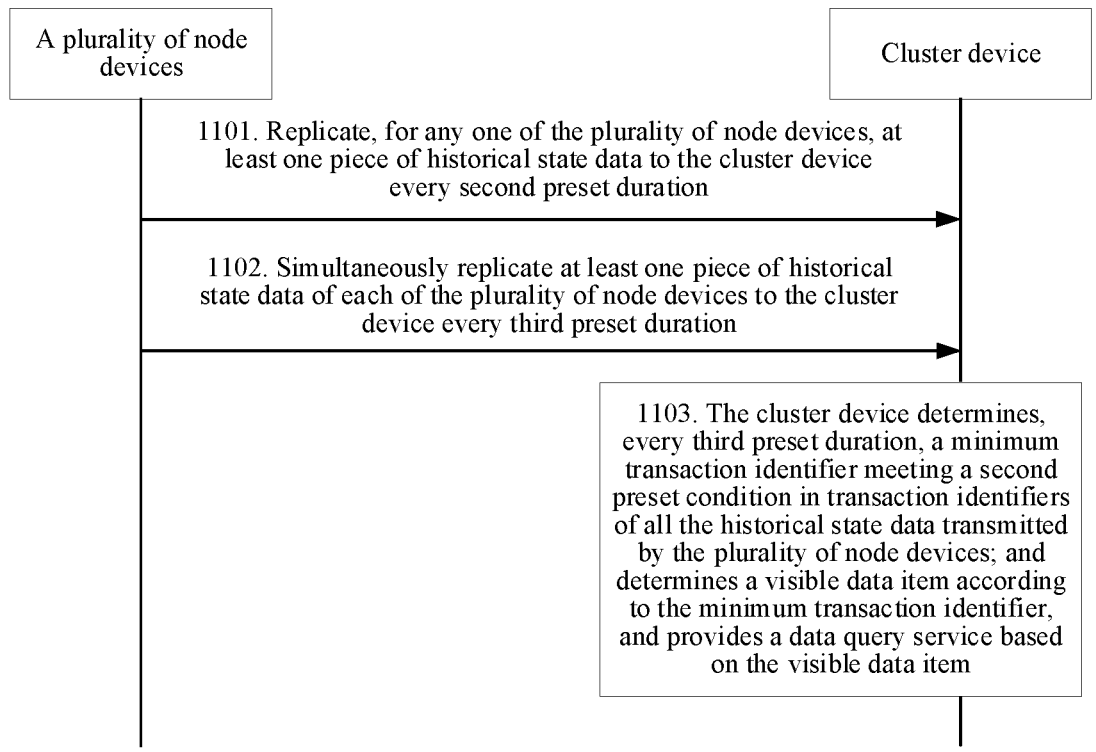
FIG. 11 is an interaction flowchart of a data system according to an embodiment of this application.

FIG. 11 is an interaction flowchart of a data system according to an embodiment of this application. Referring to FIG. 11, the data system includes a cluster device of an AP cluster and a plurality of node devices of a TP cluster. A process of performing a micro-Checkpoint operation and a Checkpoint operation from the TP cluster to the AP cluster is described in detail below:

1101. Replicate, for any one of the plurality of node devices, at least one piece of historical state data of the node device to the cluster device every second preset duration.

In step 1101, each node device in the TP cluster performs the micro-Checkpoint operation once every second preset duration, to replicate at least one piece of historical state data of the node device to the cluster device.

The second preset duration is the same as that in step 202, the micro-Checkpoint operation has been described in detail in step 204, and the data replication process is similar to that in step 201 to step 209. Details are not described herein again.

1102. The plurality of node devices simultaneously replicate at least one piece of historical state data of each of the node devices to the cluster device every third preset duration, the third preset duration being greater than the second preset duration.

The third preset duration may be any value greater than the second preset duration. In some embodiments, the second preset duration corresponds to a micro-Checkpoint operation frequency, and the third preset duration corresponds to a checkpoint operation frequency.

In step 204, the TP cluster traverses each node device of the TP cluster every third preset duration, and performs the Checkpoint operation once, to replicate at least one piece of historical state data of each of all the node devices in the TP cluster to the cluster device. The data replication process is similar to that in step 201 to step 209. Details are not described herein again.

1103. The cluster device determines, every third preset duration, a minimum transaction identifier meeting a second preset condition in transaction identifiers of all the historical state data transmitted by the plurality of node devices, the second preset condition being used for indicating that all data items corresponding to all sub-transactions of a transaction have been stored in the cluster database; and determines a visible data item according to the minimum transaction identifier, and provides a data query service based on the visible data item, a transaction identifier of the visible data item being less than or equal to the minimum transaction identifier.

Step 1103 is similar to step 901 to step 904. Details are not described herein again.

In the data system provided in the embodiments of this application, by using an interaction process between the TP cluster and the AP cluster, it is reflected at a system level that each node device in the TP cluster performs the micro-Checkpoint operation every second preset duration, and all node devices in the entire TP cluster perform the Checkpoint operation once every third preset duration. Therefore, not only a real-time updating requirement of the AP cluster for the historical state data can be met, ensuring the real-time usability of the AP cluster, but also a traversing and determining duration consumed in the data replication process is reduced by using the micro-Checkpoint operation, improving the efficiency of data replication.

Figure 12:
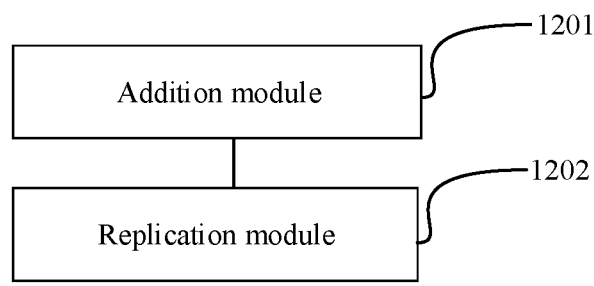
FIG. 12 is a schematic structural diagram of a data replication apparatus according to an embodiment of this application.

FIG. 12 is a schematic structural diagram of a data replication apparatus according to an embodiment of this application. Referring to FIG. 12, the apparatus includes an addition module 1201 and a replication module 1202. Details are described below:

The addition module 1201 is configured to add, when a commitment operation of a transaction is detected, historical state data of the transaction to a data queue, the data queue being configured for caching historical state data.

The addition module 1201 is further configured to add at least one piece of historical state data in the data queue to a transmission buffer, the transmission buffer being configured for caching to-be-replicated historical state data.

The replication module 1202 is configured to replicate, when a first preset condition is met, the at least one piece of historical state data in the transmission buffer to a cluster device.

In the apparatus provided in the embodiments of this application, when a commitment operation of a transaction is detected, historical state data of the transaction is added to a data queue, to cache the historical state data of the transaction into the data queue. At least one piece of historical state data in the data queue is added to a transmission buffer, so that a transmission process or a transmission thread is performed based on the transmission buffer. In a case that a first preset condition is met, the at least one piece of historical state data in the transmission buffer is replicated to a cluster device, so that a node device can replicate historical state data in the transmission buffer to the cluster device every time the first preset condition is met. In this way, the node device does not need to convert an original historical state data format into a log format, and the cluster device does not need to parse a log into an original data format for storage. Therefore, the redo log does not need to be replayed for historical state data during data replication, avoiding a cumbersome replay procedure, shortening a duration of a replay process of the redo log, and improving the efficiency of the data replication process.

In some implementations, the addition module 1201 is configured to:
add, when it is detected that historical state data is added to the data queue, the historical state data to the transmission buffer.

The replication module 1202 is configured to:
replicate, when it is detected that historical state data is added to the transmission buffer, the at least one piece of historical state data in the transmission buffer to the cluster device.

In some implementations, the addition module 1201 is configured to:
obtain, every first preset duration, at least one piece of historical state data added to the data queue within the first preset duration before a current moment; and
sort the at least one piece of historical state data according to transaction commitment timestamps in ascending order, sort, when there are a plurality of pieces of historical state data having the same transaction commitment timestamp, the plurality of pieces of historical state data according to transaction identifiers in ascending order, to obtain at least one piece of orderly arranged historical state data, and add the at least one piece of orderly arranged historical state data to the transmission buffer.

In some implementations, the first preset condition is that it is detected that any historical state data is added to the transmission buffer; or
the first preset condition is that it is detected that a proportion of an amount of used data in the transmission buffer to a capacity of the transmission buffer reaches a proportion threshold; or
the first preset condition is that a duration between the current moment and a previous moment at which historical state data in the transmission buffer is replicated to the cluster device reaches a second preset duration; or the first preset condition is that a duration between the current moment and a previous moment at which historical state data in the transmission buffer is replicated to the cluster device reaches a third preset duration, the third preset duration being the same preset duration configured for each of the plurality of node devices, and the third preset duration being greater than the second preset duration.

In some implementations, based on the apparatus composition of FIG. 12, the apparatus further includes:

a clearing module, configured to clear, when a replication success response transmitted by the cluster device is received, the transmission buffer corresponding to the replication success response.

In some implementations, the addition module 1201 is further configured to: evenly add historical state data from the same original data table in the data queue to the plurality of transmission buffers.

During data replication, the data replication apparatus provided in the foregoing embodiment is illustrated with an example of division of the foregoing functional modules. In actual application, the functions may be allocated to and completed by different functional modules according to requirements, that is, the internal structure of the node device is divided into different functional modules, to implement all or some of the functions described above. In addition, the data replication apparatus provided in the embodiment above and the embodiment of the data replication method belong to the same concept. For a specific implementation process, refer to the embodiments of the data replication method. Details are not described herein again.

Figure 13:
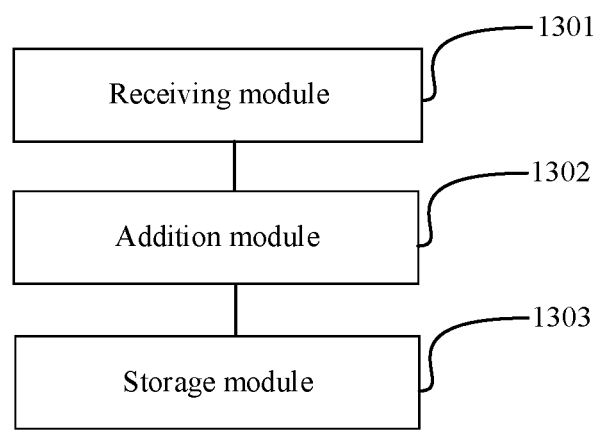
FIG. 13 is a schematic structural diagram of a data replication apparatus according to an embodiment of this application.

FIG. 13 is a schematic structural diagram of a data replication apparatus according to an embodiment of this application. Referring to FIG. 13, the apparatus includes a receiving module 1301, an addition module 1302, and a storage module 1203. Details are described below:

The receiving module 1301 is configured to receive, from a receiving buffer, at least one piece of historical state data transmitted by a node device, the receiving buffer being configured for caching received historical state data.

The addition module 1302 is configured to add the at least one piece of historical state data in the receiving buffer to a forwarding buffer, and convert, by using the forwarding buffer, the at least one piece of historical state data into data meeting a tuple format, to obtain at least one data item, the forwarding buffer being configured for performing data format conversion on historical state data.

The storage module 1303 is configured to store the at least one data item in at least one target data table of a cluster database, one target data table being corresponding to one original data table in which one data item is located in the node device.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In the apparatus provided in the embodiments of this application, after receiving, from a receiving buffer, at least one piece of historical state data transmitted by the node device, the at least one piece of historical state data in the receiving buffer is added to a forwarding buffer, and the at least one piece of historical state data is converted, by using the forwarding buffer, into data meeting a tuple format, to obtain at least one data item, so as to restore a format of the compressed historical state data. Because the historical state data maintained in the original format is directly obtained, an operation of parsing a log to obtain historical state data may be avoided. The at least one data item is stored in at least one target data table in a cluster database, so that the historical state data is properly stored.

In some implementations, based on the apparatus composition of FIG. 13, the storage module 1303 includes:

a first storage unit, configured to store, for a data item in tuple according to a storage format in an original data table in which the data item is located, the data item in a target data table corresponding to the original data table; or a second storage unit, configured to store, for a data item indicating a field change status, the data item in a target data table corresponding to an original data table according to a storage format of a key-value pair.

In some implementations, the second storage unit is configured to:

determine at least one of a key of the data item in the original data table and a generation time of the data item as a key of the data item in the target data table; and determine a changed field of the data item in the original data table as a value of the data item in the target data table.

In some implementations, based on the apparatus composition of FIG. 13, the apparatus further includes:

a determining module, configured to determine a minimum transaction identifier meeting a second preset condition in transaction identifiers of the at least one piece of historical state data, the second preset condition being used for indicating that all data items corresponding to all sub-transactions of a transaction have been stored in the cluster database;

a query module, configured to determine a visible data item according to the minimum transaction identifier, and provide a data query service based on the visible data item, a transaction identifier of the visible data item being less than or equal to the minimum transaction identifier.

In some implementations, based on the apparatus composition of FIG. 13, the determining module includes:

a sorting unit, configured to sort the at least one piece of historical state data according to transaction commitment timestamps in ascending order, and sort, when there are a plurality of pieces of historical state data having the same transaction commitment timestamp, the plurality of pieces of historical state data according to transaction identifiers in ascending order, to obtain a target data sequence;

an obtaining unit, configured to obtain at least one transaction meeting the second preset condition from the target data sequence; and a determining unit, configured to determine a transaction identifier of a top-ranked transaction in the at least one transaction as the minimum transaction identifier.

In some implementations, the obtaining unit includes:
a traversing and determining subunit, configured to traverse the target data sequence, perform a bitwise AND operation on bitmap code of each piece of historical state data, and determine that a transaction corresponding to historical state data having an output of true meets the second preset condition.

The traversing and determining subunit is further configured to traverse the target data sequence, and decode a compression dictionary of each piece of historical state data, to obtain a global transaction identifier corresponding to the each piece of historical state data; and determine, when it is determined that all data items of sub-transactions corresponding to the global transaction identifier have been stored in the cluster database, that a transaction corresponding to the global transaction identifier meets the second preset condition.

In some implementations, the traversing and determining subunit is further configured to:
obtain, according to the global transaction identifier, the data items that have been stored in the cluster database and have the global transaction identifier, and determine, when the obtained data items and the historical state data obtained through decoding correspond to all sub-transactions of the transaction, that all the data items of the sub-transactions corresponding to the global transaction identifier have been stored in the cluster database.

In some implementations, the receiving module 1301 is configured to:
receive, from the receiving buffer every second preset duration, at least one piece of historical state data transmitted by any node device; or
receive, from the receiving buffer every third preset duration, at least one piece of historical state data simultaneously transmitted by a plurality of node devices.

During data replication, the data replication apparatus provided in the foregoing embodiment is illustrated with an example of division of the foregoing functional modules. In actual application, the functions may be allocated to and completed by different functional modules according to requirements, that is, the internal structure of the cluster device is divided into different functional modules, to implement all or some of the functions described above. In addition, the data replication apparatus provided in the embodiment above and the embodiment of the data replication method belong to the same concept. For a specific implementation process, refer to the embodiments of the data replication method. Details are not described herein again.

Figure 14:
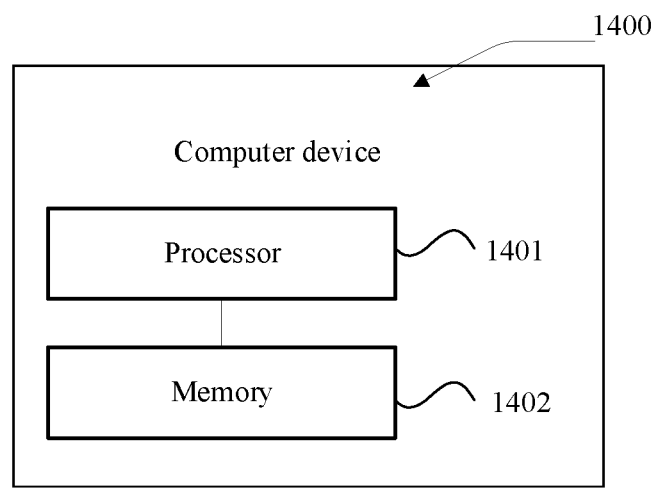
FIG. 14 is a schematic structural diagram of a computer device according to an embodiment of this application.

FIG. 14 is a schematic structural diagram of a computer device according to an embodiment of this application. The computer device 1400 may vary a lot due to different configurations or performance, and may include one or more processors (central processing units (CPUs)) 1401 and one or more memories 1402. The memory 1402 stores at least one instruction, the at least one instruction being loaded and executed by the processor 1401 to implement the data replication method provided in the foregoing data replication method embodiments. Certainly, the computer device may also have components such as a wired or wireless network interface, a keyboard, and an input/output interface for ease of input/output, and may further include other components for implementing functions of the device. Details are not described herein again.

In an exemplary embodiment, a computer-readable storage medium, for example, a memory including at least one instruction is further provided. The at least one instruction may be executed by a processor in a terminal to implement the data replication method in the foregoing embodiments. For example, the computer-readable storage medium may be a ROM, a random access memory (RAM), a CD-ROM, a magnetic tape, a floppy disk, or an optical data storage device.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A data replication method, performed by a computer device, the method comprising:
receiving, from a receiving buffer, at least one piece of historical state data transmitted by a node device, the receiving buffer being configured for caching received historical state data;
adding the at least one piece of historical state data in the receiving buffer to a forwarding buffer, and converting, by using the forwarding buffer, the at least one piece of historical state data from a compressed data format into data meeting a tuple format, to obtain at least one data item, the forwarding buffer being configured for performing data format conversion on historical state data; and
storing the at least one data item in at least one target data table of a cluster database, one target data table being corresponding to one original data table in which one data item is located in the node device.

2. The method according to claim 1, wherein the storing the at least one data item in at least one target data table of a cluster database comprises:
storing, for a data item in tuple according to a storage format in an original data table in which the data item is located, the data item in a target data table corresponding to the original data table; or
storing, for a data item indicating a field change status, the data item in a target data table corresponding to an original data table according to a storage format of a key-value pair.

3. The method according to claim 2, wherein the storing the data item in a target data table corresponding to an original data table according to a storage format of a key-value pair comprises:
determining at least one of a key of the data item in the original data table and a generation time of the data item as a key of the data item in the target data table; and
determining a changed field of the data item in the original data table as a value of the data item in the target data table.

4. The method according to claim 1, further comprising:
determining a minimum transaction identifier meeting a second preset condition in transaction identifiers of the at least one piece of historical state data, the second preset condition being used for indicating that all data items corresponding to all sub-transactions of a transaction have been stored in the cluster database;

determining a visible data item according to the minimum transaction identifier, a transaction identifier of the visible data item being less than or equal to the minimum transaction identifier; and providing a data query service based on the visible data item.

5. The method according to claim 4, wherein the determining a minimum transaction identifier meeting a second preset condition in transaction identifiers of the at least one piece of historical state data comprises:

sorting the at least one piece of historical state data according to transaction commitment timestamps in ascending order, and sorting, when there are a plurality of pieces of historical state data having the same transaction commitment timestamp, the plurality of pieces of historical state data according to transaction identifiers in ascending order, to obtain a target data sequence;

obtaining at least one transaction meeting the second preset condition from the target data sequence; and determining a transaction identifier of a top-ranked transaction in the at least one transaction as the minimum transaction identifier.

6. The method according to claim 5, wherein the obtaining at least one transaction meeting the second preset condition from the target data sequence comprises:

traversing the target data sequence, performing a bitwise AND operation on bitmap code of each piece of historical state data, and determining that a transaction corresponding to historical state data having an output of true meets the second preset condition; or traversing the target data sequence, and decoding a compression dictionary of each piece of historical state data, to obtain a global transaction identifier corresponding to the each piece of historical state data; and determining, when it is determined that all data items of sub-transactions corresponding to the global transaction identifier have been stored in the cluster database, that a transaction corresponding to the global transaction identifier meets the second preset condition.

7. The method according to claim 6, wherein in the case that it is determined that all data items of sub-transactions corresponding to the global transaction identifier have been stored in the cluster database comprises:

obtaining, according to the global transaction identifier, the data items that have been stored in the cluster database and have the global transaction identifier, and determining, when the obtained data items and the historical state data obtained through decoding correspond to all sub-transactions of the transaction, that all the data items of the sub-transactions corresponding to the global transaction identifier have been stored in the cluster database.

8. The method according to claim 1, wherein the receiving, from a receiving buffer, at least one piece of historical state data transmitted by a node device comprises:

receiving, from the receiving buffer every second preset duration, at least one piece of historical state data transmitted by a node device; or receiving, from the receiving buffer every third preset duration, at least one piece of historical state data simultaneously transmitted by a plurality of node devices.

9. A computer device, comprising a processor and a memory, the memory storing at least one instruction, the at least one instruction being loaded and executed by the processor to perform a plurality of operations comprising:

receiving, from a receiving buffer, at least one piece of historical state data transmitted by a node device, the receiving buffer being configured for caching received historical state data;

adding the at least one piece of historical state data in the receiving buffer to a forwarding buffer, and converting, by using the forwarding buffer, the at least one piece of historical state data from a compressed data format into data meeting a tuple format, to obtain at least one data item, the forwarding buffer being configured for performing data format conversion on historical state data; and storing the at least one data item in at least one target data table of a cluster database, one target data table being corresponding to one original data table in which one data item is located in the node device.

10. The computer device according to claim 9, wherein the storing the at least one data item in at least one target data table of a cluster database comprises:

storing, for a data item in tuple according to a storage format in an original data table in which the data item is located, the data item in a target data table corresponding to the original data table; or storing, for a data item indicating a field change status, the data item in a target data table corresponding to an original data table according to a storage format of a key-value pair.

11. The computer device according to claim 10, wherein the storing the data item in a target data table corresponding to an original data table according to a storage format of a key-value pair comprises:

determining at least one of a key of the data item in the original data table and a generation time of the data item as a key of the data item in the target data table; and determining a changed field of the data item in the original data table as a value of the data item in the target data table.

12. The computer device according to claim 9, wherein the plurality of operations further comprise:

determining a minimum transaction identifier meeting a second preset condition in transaction identifiers of the at least one piece of historical state data, the second preset condition being used for indicating that all data items corresponding to all sub-transactions of a transaction have been stored in the cluster database;

determining a visible data item according to the minimum transaction identifier, a transaction identifier of the visible data item being less than or equal to the minimum transaction identifier; and providing a data query service based on the visible data item.

13. The computer device according to claim 12, wherein the determining a minimum transaction identifier meeting a second preset condition in transaction identifiers of the at least one piece of historical state data comprises:

sorting the at least one piece of historical state data according to transaction commitment timestamps in ascending order, and sorting, when there are a plurality of pieces of historical state data having the same transaction commitment timestamp, the plurality of pieces of historical state data according to transaction identifiers in ascending order, to obtain a target data sequence;

obtaining at least one transaction meeting the second preset condition from the target data sequence; and determining a transaction identifier of a top-ranked transaction in the at least one transaction as the minimum transaction identifier.

14. The computer device according to claim 13, wherein the obtaining at least one transaction meeting the second preset condition from the target data sequence comprises:

traversing the target data sequence, performing a bitwise AND operation on bitmap code of each piece of historical state data, and determining that a transaction corresponding to historical state data having an output of true meets the second preset condition; or traversing the target data sequence, and decoding a compression dictionary of each piece of historical state data, to obtain a global transaction identifier corresponding to the each piece of historical state data; and determining, when it is determined that all data items of sub-transactions corresponding to the global transaction identifier have been stored in the cluster database, that a transaction corresponding to the global transaction identifier meets the second preset condition.

15. The computer device according to claim 14, wherein in the case that it is determined that all data items of sub-transactions corresponding to the global transaction identifier have been stored in the cluster database comprises:

obtaining, according to the global transaction identifier, the data items that have been stored in the cluster database and have the global transaction identifier, and determining, when the obtained data items and the historical state data obtained through decoding correspond to all sub-transactions of the transaction, that all the data items of the sub-transactions corresponding to the global transaction identifier have been stored in the cluster database.

16. The computer device according to claim 9, wherein the receiving, from a receiving buffer, at least one piece of historical state data transmitted by a node device comprises:

receiving, from the receiving buffer every second preset duration, at least one piece of historical state data transmitted by a node device; or receiving, from the receiving buffer every third preset duration, at least one piece of historical state data simultaneously transmitted by a plurality of node devices.

17. A non-transitory computer-readable storage medium, storing at least one instruction, the at least one instruction being loaded and executed by a processor of a computer device to perform a plurality of operations comprising:

receiving, from a receiving buffer, at least one piece of historical state data transmitted by a node device, the receiving buffer being configured for caching received historical state data;

adding the at least one piece of historical state data in the receiving buffer to a forwarding buffer, and converting, by using the forwarding buffer, the at least one piece of historical state data from a compressed data format into data meeting a tuple format, to obtain at least one data item, the forwarding buffer being configured for performing data format conversion on historical state data; and storing the at least one data item in at least one target data table of a cluster database, one target data table being corresponding to one original data table in which one data item is located in the node device.

18. The non-transitory computer-readable storage medium according to claim 17, wherein the storing the at least one data item in at least one target data table of a cluster database comprises:

storing, for a data item in tuple according to a storage format in an original data table in which the data item is located, the data item in a target data table corresponding to the original data table; or storing, for a data item indicating a field change status, the data item in a target data table corresponding to an original data table according to a storage format of a key-value pair.

19. The non-transitory computer-readable storage medium according to claim 18, wherein the storing the data item in a target data table corresponding to an original data table according to a storage format of a key-value pair comprises:

determining at least one of a key of the data item in the original data table and a generation time of the data item as a key of the data item in the target data table; and determining a changed field of the data item in the original data table as a value of the data item in the target data table.

20. The non-transitory computer-readable storage medium according to claim 17, wherein the plurality of operations further comprise:

determining a minimum transaction identifier meeting a second preset condition in transaction identifiers of the at least one piece of historical state data, the second preset condition being used for indicating that all data items corresponding to all sub-transactions of a transaction have been stored in the cluster database;

determining a visible data item according to the minimum transaction identifier, a transaction identifier of the visible data item being less than or equal to the minimum transaction identifier; and providing a data query service based on the visible data item.

* * * * *